(12) United States Patent
Razouane et al.

(10) Patent No.: US 10,448,139 B2
(45) Date of Patent: *Oct. 15, 2019

(54) SELECTIVE SOUND FIELD ENVIRONMENT PROCESSING SYSTEM AND METHOD

(71) Applicant: BRAGI GmbH, München (DE)

(72) Inventors: Mohamed Ali Razouane, München (DE); Peter Vincent Boesen, München (DE); Gwenael Kosider, München (DE); David K Dohmen, München (DE)

(73) Assignee: BRAGI GmbH, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/044,318

(22) Filed: Jul. 24, 2018

(65) Prior Publication Data

US 2018/0359554 A1    Dec. 13, 2018

Related U.S. Application Data

(63) Continuation of application No. 15/635,839, filed on Jun. 28, 2017, now Pat. No. 10,045,110.

(Continued)

(51) Int. Cl.
*H04R 1/10* (2006.01)
*H04R 1/40* (2006.01)
(Continued)

(52) U.S. Cl.
CPC .......... *H04R 1/1041* (2013.01); *G06F 3/165* (2013.01); *G06F 3/167* (2013.01); *G10L 15/08* (2013.01);
(Continued)

(58) Field of Classification Search
CPC ... G10L 21/0364; G10L 15/22; H04R 1/1041; H04R 2410/05; H04R 2460/01
See application file for complete search history.

(56) References Cited

U.S. PATENT DOCUMENTS 2,325,590 A    8/1943    Carlisle et al.
2,430,229 A    11/1947   Kelsey
(Continued)

FOREIGN PATENT DOCUMENTS

CN    204244472 U    4/2015
CN    104683519 A    6/2015
(Continued)

OTHER PUBLICATIONS

Stretchgoal—The Carrying Case for the Dash (Feb. 12, 2014).
(Continued)

*Primary Examiner* — Mohammad K Islam
(74) *Attorney, Agent, or Firm* — Goodhue, Coleman & Owens, P.C.

(57) ABSTRACT

A method for selective sound field environment processing for one or more wireless earpieces, each of the one or more wireless earpieces including comprising a plurality of microphones is provided. The method includes receiving audio input of a sound field environment from the plurality of microphones of each of the one or more wireless earpieces, identifying background noise in the sound field environment, identifying audio from at least one sound source within the sound field environment, processing the audio input using one or more processors of at least one of the wireless earpieces to reduce the background noise and processing the audio input using one or more processors of the at least one of the wireless earpieces to enhance the audio from the at least one sound source within the sound field environment to provide processed audio, and transducing the processed audio at one or more speakers of the one or more wireless earpieces.

20 Claims, 8 Drawing Sheets

Related U.S. Application Data

(60) Provisional application No. 62/358,792, filed on Jul. 6, 2016.

(51) Int. Cl.

| | | |
|---|---|---|
| *H04R 3/00* | (2006.01) | |
| *G10L 17/22* | (2013.01) | |
| *G06F 3/16* | (2006.01) | |
| *G10L 15/08* | (2006.01) | |
| *G10L 21/0232* | (2013.01) | |
| *G10L 21/02* | (2013.01) | |
| *G10L 21/0216* | (2013.01) | |
| *G10L 21/0208* | (2013.01) | |
| *G10L 21/0272* | (2013.01) | |

(52) U.S. Cl.
CPC .............. *G10L 17/22* (2013.01); *G10L 21/02* (2013.01); *G10L 21/0232* (2013.01); *H04R 1/1016* (2013.01); *H04R 1/1083* (2013.01); *H04R 1/406* (2013.01); *H04R 3/005* (2013.01); *G10L 21/0208* (2013.01); *G10L 21/0272* (2013.01); *G10L 2015/088* (2013.01); *G10L 2021/02166* (2013.01); *H04R 2420/07* (2013.01)

(56) References Cited

U.S. PATENT DOCUMENTS

| | | |
|---|---|---|
| 3,047,089 A | 7/1962 | Zwislocki |
| D208,784 S | 10/1967 | Sanzone |
| 3,586,794 A | 6/1971 | Michaelis |
| 3,696,377 A | 10/1972 | Wall |
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| 5,444,786 A | 8/1995 | Raviv |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| 5,844,996 A | 12/1998 | Enzmann et al. |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,185,152 B1 | 2/2001 | Shen |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,563,301 B2 | 5/2003 | Gventer |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| 7,532,901 B1 | 5/2009 | LaFranchise et al. |
| D601,134 S | 9/2009 | Elabidi et al. |
| 7,825,626 B2 | 11/2010 | Kozisek |
| 7,859,469 B1 | 12/2010 | Rosener et al. |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| 8,238,967 B1 | 8/2012 | Arnold et al. |
| D666,581 S | 9/2012 | Perez |
| 8,300,864 B2 | 10/2012 | Müllenborn et al. |
| 8,406,448 B2 | 3/2013 | Lin et al. |
| 8,430,817 B1 | 4/2013 | Al-Ali et al. |
| 8,436,780 B2 | 5/2013 | Schantz et al. |
| D687,021 S | 7/2013 | Yuen |
| 8,679,012 B1 | 3/2014 | Kayyali |
| 8,719,877 B2 | 5/2014 | VonDoenhoff et al. |

(56) References Cited

U.S. PATENT DOCUMENTS

| | | |
|---|---|---|
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,317,241 B2 | 4/2016 | Tranchina |
| 9,461,403 B2 | 10/2016 | Gao et al. |
| 9,510,159 B1 | 11/2016 | Cuddihy et al. |
| D773,439 S | 12/2016 | Walker |
| D775,158 S | 12/2016 | Dong et al. |
| 9,524,631 B1 | 12/2016 | Agrawal et al. |
| D777,710 S | 1/2017 | Palmborg et al. |
| 9,544,689 B2 | 1/2017 | Fisher et al. |
| D788,079 S | 5/2017 | Son et al. |
| 9,684,778 B2 | 6/2017 | Tharappel et al. |
| 9,711,062 B2 | 7/2017 | Ellis et al. |
| 9,711,162 B2 * | 7/2017 | Murthy ............... G10L 21/0208 |
| 9,729,979 B2 | 8/2017 | Özden |
| 9,767,709 B2 | 9/2017 | Ellis |
| 9,821,767 B2 | 11/2017 | Nixon |
| 9,848,257 B2 | 12/2017 | Ambrose et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0102931 A1 | 5/2004 | Ellis et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0197063 A1 | 9/2005 | White |
| 2005/0212911 A1 | 9/2005 | Marvit et al. |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2007/0021958 A1 * | 1/2007 | Visser ............... G10L 21/0272 704/226 |
| 2007/0102009 A1 | 5/2007 | Wong et al. |
| 2007/0160243 A1 * | 7/2007 | Dijkstra ............... H04B 1/123 381/317 |
| 2007/0239225 A1 | 10/2007 | Saringer |
| 2007/0247800 A1 | 10/2007 | Smith et al. |
| 2007/0269785 A1 | 11/2007 | Yamanoi |
| 2008/0076972 A1 | 3/2008 | Dorogusker et al. |
| 2008/0090622 A1 | 4/2008 | Kim et al. |
| 2008/0102424 A1 | 5/2008 | Holljes |
| 2008/0146890 A1 | 6/2008 | LeBoeuf et al. |
| 2008/0187163 A1 | 8/2008 | Goldstein et al. |
| 2008/0215239 A1 | 9/2008 | Lee |
| 2008/0253583 A1 | 10/2008 | Goldstein et al. |
| 2008/0254780 A1 | 10/2008 | Kuhl et al. |
| 2008/0255430 A1 | 10/2008 | Alexandersson et al. |
| 2008/0298606 A1 | 12/2008 | Johnson et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0041313 A1 | 2/2009 | Brown |
| 2009/0073070 A1 | 3/2009 | Rofougaran |
| 2009/0097689 A1 | 4/2009 | Prest et al. |
| 2009/0105548 A1 | 4/2009 | Bart |
| 2009/0154739 A1 | 6/2009 | Zellner |
| 2009/0164212 A1 * | 6/2009 | Chan ............... G10L 21/0208 704/226 |
| 2009/0182913 A1 | 7/2009 | Rosenblatt et al. |
| 2009/0191920 A1 | 7/2009 | Regen et al. |
| 2009/0226017 A1 | 9/2009 | Abolfathi et al. |
| 2009/0240947 A1 | 9/2009 | Goyal et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2009/0303073 A1 | 12/2009 | Gilling et al. |
| 2009/0304210 A1 | 12/2009 | Weisman |
| 2010/0007805 A1 | 1/2010 | Vitito |
| 2010/0033313 A1 | 2/2010 | Keady et al. |
| 2010/0075631 A1 | 3/2010 | Black et al. |
| 2010/0131269 A1 * | 5/2010 | Park ............... G10K 11/178 704/233 |
| 2010/0166206 A1 | 7/2010 | Macours |
| 2010/0203831 A1 | 8/2010 | Muth |
| 2010/0210212 A1 | 8/2010 | Sato |
| 2010/0290636 A1 | 11/2010 | Mao et al. |
| 2010/0320961 A1 | 12/2010 | Castillo et al. |
| 2011/0018731 A1 | 1/2011 | Linsky et al. |
| 2011/0103609 A1 | 5/2011 | Pelland et al. |
| 2011/0137141 A1 | 6/2011 | Razoumov et al. |
| 2011/0140844 A1 | 6/2011 | McGuire et al. |
| 2011/0239497 A1 | 10/2011 | McGuire et al. |
| 2011/0286615 A1 | 11/2011 | Olodort et al. |
| 2011/0293103 A1 * | 12/2011 | Park ............... G10L 21/0208 381/57 |
| 2011/0293105 A1 | 12/2011 | Arie et al. |
| 2012/0057740 A1 | 3/2012 | Rosal |
| 2012/0155670 A1 | 6/2012 | Rutschman |
| 2012/0159617 A1 | 6/2012 | Wu et al. |
| 2012/0162891 A1 | 6/2012 | Tranchina et al. |
| 2012/0163626 A1 | 6/2012 | Booij et al. |
| 2012/0197737 A1 | 8/2012 | LeBoeuf et al. |
| 2012/0215519 A1 * | 8/2012 | Park ............... G06F 17/289 704/2 |
| 2012/0235883 A1 | 9/2012 | Border et al. |
| 2012/0309453 A1 | 12/2012 | Maguire |
| 2013/0106454 A1 | 5/2013 | Liu et al. |
| 2013/0154826 A1 | 6/2013 | Ratajczyk |
| 2013/0178967 A1 | 7/2013 | Mentz |
| 2013/0200999 A1 | 8/2013 | Spodak et al. |
| 2013/0204617 A1 | 8/2013 | Kuo et al. |
| 2013/0293494 A1 | 11/2013 | Reshef |
| 2013/0316642 A1 | 11/2013 | Newham |
| 2013/0346168 A1 | 12/2013 | Zhou et al. |
| 2014/0002357 A1 | 1/2014 | Pombo et al. |
| 2014/0004912 A1 | 1/2014 | Rajakarunanayake |
| 2014/0014697 A1 | 1/2014 | Schmierer et al. |
| 2014/0020089 A1 | 1/2014 | Perini, II |
| 2014/0072136 A1 | 3/2014 | Tenenbaum et al. |
| 2014/0072146 A1 | 3/2014 | Itkin et al. |
| 2014/0073429 A1 | 3/2014 | Meneses et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0146973 A1 | 5/2014 | Liu et al. |
| 2014/0153768 A1 | 6/2014 | Hagen et al. |
| 2014/0163771 A1 | 6/2014 | Demeniuk |
| 2014/0185828 A1 | 7/2014 | Helbling |

(56) References Cited

U.S. PATENT DOCUMENTS

| | | |
|---|---|---|
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0237518 A1 | 8/2014 | Liu |
| 2014/0270227 A1 | 9/2014 | Swanson |
| 2014/0270271 A1 | 9/2014 | Dehe et al. |
| 2014/0276227 A1 | 9/2014 | Pérez |
| 2014/0279889 A1 | 9/2014 | Luna |
| 2014/0310595 A1 | 10/2014 | Acharya et al. |
| 2014/0321682 A1 | 10/2014 | Kofod-Hansen et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0035643 A1 | 2/2015 | Kursun |
| 2015/0036835 A1 | 2/2015 | Chen |
| 2015/0056584 A1 | 2/2015 | Boulware et al. |
| 2015/0110587 A1 | 4/2015 | Hori |
| 2015/0124058 A1 | 5/2015 | Okpeva et al. |
| 2015/0148989 A1 | 5/2015 | Cooper et al. |
| 2015/0181356 A1 | 6/2015 | Krystek et al. |
| 2015/0230022 A1 | 8/2015 | Sakai et al. |
| 2015/0243271 A1* | 8/2015 | Goldstein ............ G10L 21/0208 381/71.6 |
| 2015/0245127 A1 | 8/2015 | Shaffer |
| 2015/0256949 A1 | 9/2015 | Vanpoucke et al. |
| 2015/0264472 A1 | 9/2015 | Aase |
| 2015/0264501 A1 | 9/2015 | Hu et al. |
| 2015/0317565 A1 | 11/2015 | Li et al. |
| 2015/0358751 A1 | 12/2015 | Deng et al. |
| 2015/0359436 A1 | 12/2015 | Shim et al. |
| 2015/0364058 A1 | 12/2015 | Lagree et al. |
| 2015/0373467 A1 | 12/2015 | Gelter |
| 2015/0373474 A1 | 12/2015 | Kraft et al. |
| 2015/0379251 A1 | 12/2015 | Komaki |
| 2016/0029122 A1* | 1/2016 | Domingo Yaguez .. H04R 3/005 381/92 |
| 2016/0033280 A1 | 2/2016 | Moore et al. |
| 2016/0034249 A1 | 2/2016 | Lee et al. |
| 2016/0071526 A1* | 3/2016 | Wingate ................ G10L 21/028 704/233 |
| 2016/0072558 A1 | 3/2016 | Hirsch et al. |
| 2016/0073189 A1 | 3/2016 | Lindén et al. |
| 2016/0094550 A1 | 3/2016 | Bradley et al. |
| 2016/0100262 A1 | 4/2016 | Inagaki |
| 2016/0119737 A1 | 4/2016 | Mehnert et al. |
| 2016/0124707 A1 | 5/2016 | Ermilov et al. |
| 2016/0125892 A1 | 5/2016 | Bowen et al. |
| 2016/0140870 A1 | 5/2016 | Connor |
| 2016/0142818 A1 | 5/2016 | Park |
| 2016/0162259 A1 | 6/2016 | Zhao et al. |
| 2016/0209691 A1 | 7/2016 | Yang et al. |
| 2016/0226713 A1 | 8/2016 | Dellinger et al. |
| 2016/0253994 A1 | 9/2016 | Panchapagesan et al. |
| 2016/0324478 A1 | 11/2016 | Goldstein |
| 2016/0353196 A1 | 12/2016 | Baker et al. |
| 2016/0360350 A1 | 12/2016 | Watson et al. |
| 2016/0381450 A1* | 12/2016 | Taite ........................ G08B 3/10 381/74 |
| 2017/0021257 A1 | 1/2017 | Gilbert et al. |
| 2017/0046503 A1 | 2/2017 | Cho et al. |
| 2017/0048609 A1* | 2/2017 | Schnell ................ H04R 1/1083 |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0061817 A1 | 3/2017 | Mettler May |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |
| 2017/0078785 A1 | 3/2017 | Qian et al. |
| 2017/0096065 A1 | 4/2017 | Katsuno et al. |
| 2017/0100277 A1 | 4/2017 | Ke |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0127168 A1 | 5/2017 | Briggs et al. |
| 2017/0131094 A1 | 5/2017 | Kulik |
| 2017/0142511 A1 | 5/2017 | Dennis |
| 2017/0146801 A1 | 5/2017 | Stempora |
| 2017/0150920 A1 | 6/2017 | Chang et al. |
| 2017/0151085 A1 | 6/2017 | Chang et al. |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0164890 A1 | 6/2017 | Leip et al. |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0193975 A1* | 7/2017 | Butts .................. G10L 21/0216 |
| 2017/0193978 A1 | 7/2017 | Goldman |
| 2017/0194021 A1* | 7/2017 | Butts ................ G06F 17/30778 |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0248955 A1* | 8/2017 | Banvait .................. G05D 1/0255 |
| 2017/0251295 A1 | 8/2017 | Pergament et al. |
| 2017/0251933 A1 | 9/2017 | Braun et al. |
| 2017/0257698 A1 | 9/2017 | Boesen et al. |
| 2017/0258329 A1 | 9/2017 | Marsh |
| 2017/0263236 A1 | 9/2017 | Boesen et al. |
| 2017/0263376 A1 | 9/2017 | Verschueren et al. |
| 2017/0266494 A1 | 9/2017 | Crankson et al. |
| 2017/0273622 A1 | 9/2017 | Boesen |
| 2017/0280257 A1 | 9/2017 | Gordon et al. |
| 2017/0297430 A1 | 10/2017 | Hori et al. |
| 2017/0301337 A1 | 10/2017 | Golani et al. |
| 2017/0361213 A1 | 12/2017 | Goslin et al. |
| 2017/0366233 A1 | 12/2017 | Hviid et al. |
| 2018/0007994 A1 | 1/2018 | Boesen et al. |
| 2018/0008194 A1 | 1/2018 | Boesen |
| 2018/0008198 A1 | 1/2018 | Kingscott |
| 2018/0009447 A1 | 1/2018 | Boesen et al. |
| 2018/0011006 A1 | 1/2018 | Kingscott |
| 2018/0011682 A1 | 1/2018 | Milevski et al. |
| 2018/0011994 A1 | 1/2018 | Boesen |
| 2018/0012228 A1 | 1/2018 | Milevski et al. |
| 2018/0013195 A1 | 1/2018 | Hviid et al. |
| 2018/0014102 A1 | 1/2018 | Hirsch et al. |
| 2018/0014103 A1 | 1/2018 | Martin et al. |
| 2018/0014104 A1 | 1/2018 | Boesen et al. |
| 2018/0014107 A1 | 1/2018 | Razouane et al. |
| 2018/0014108 A1 | 1/2018 | Dragicevic et al. |
| 2018/0014109 A1 | 1/2018 | Boesen |
| 2018/0014113 A1 | 1/2018 | Boesen |
| 2018/0014140 A1 | 1/2018 | Milevski et al. |
| 2018/0014436 A1 | 1/2018 | Milevski |
| 2018/0034951 A1 | 2/2018 | Boesen |
| 2018/0040093 A1 | 2/2018 | Boesen |

(56) References Cited

U.S. PATENT DOCUMENTS

| | | |
|---|---|---|
| 2018/0042501 A1 | 2/2018 | Adi et al. |
| 2018/0056903 A1 | 3/2018 | Mullett |
| 2018/0063626 A1 | 3/2018 | Pong et al. |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 4/1981 |
| GB | 2508226 A | 5/2014 |
| JP | 06292195 | 10/1998 |
| WO | 2008103925 A1 | 8/2008 |
| WO | 2008113053 A1 | 9/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |
| WO | 2016187869 A1 | 12/2016 |

OTHER PUBLICATIONS

Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
Weisiger; "Conjugated Hyperbilirubinemia", Jan. 5, 2016.
Wertzner et al., "Analysis of fundamental frequency, jitter, shimmer and vocal intensity in children with phonological disorders", V. 71, n.5, 582-588, Sep./Oct. 2005; Brazilian Journal of Othrhinolaryngology.
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).
Akkermans, "Acoustic Ear Recognition for Person Identification", Automatic Identification Advanced Technologies, 2005 pp. 219-223.
Alzahrani et al: "A Multi-Channel Opto-Electronic Sensor to Accurately Monitor Heart Rate against Motion Artefact during Exercise", Sensors, vol. 15, No. 10, Oct. 12, 2015, pp. 25681-25702, XPO55334602, DOI: 10.3390/s151025681 the whole document.
Announcing the $3,333,333 Stretch Goal (Feb. 24, 2014).
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Lets Get Ready to Rumble, A Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing-Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping Up (Nov. 13, 2015).
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2015).
BRAGI Update—On Track, Design Verification, How It Works and What's Next(Jul. 15, 2015).
BRAGI Update—On Track, On Track and Gems Overview (Jun. 24, 2015).
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Healthcare Risk Management Review, "Nuance updates computer-assisted physician documentation solution" (Oct. 20, 2016).
Hoffman, "How to Use Android Beam to Wirelessly Transfer Content Between Devices", (Feb. 22, 2013).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces a Health + Mobility Concept for Wellness in Mobility", Fountain Valley, Califorina (2017).
International Search Report & Written Opinion, PCT/EP16/70245 (dated Nov. 16, 2016).
International Search Report & Written Opinion, PCT/EP2016/070231 (dated Nov. 18, 2016).
International Search Report & Written Opinion, PCT/EP2016/070247 (dated Nov. 18, 2016).
International Search Report & Written Opinion, PCT/EP2016/07216 (dated Oct. 18, 2016).
International Search Report and Written Opinion, PCT/EP2016/070228 (dated Jan. 9, 2017).
Jain A et al: "Score normalization in multimodal biometric systems", Pattern Recognition, Elsevier, GB, vol. 38, No. 12, Dec. 31, 2005, pp. 2270-2285, XP027610849, ISSN: 0031-3203.
Last Push Before the Kickstarter Campaign Ends on Monday 4pm CET (Mar. 28, 2014).

(56) References Cited

OTHER PUBLICATIONS

Lovejoy: "Touch ID built into iPhone display one step closer as third-party company announces new tech", "http://9to5mac.com/2015/07/21/virtualhomebutton/" (Jul. 21, 2015).
Nemanja Paunovic et al, "A methodology for testing complex professional electronic systems", Serbian Journal of Electrical Engineering, vol. 9, No. 1, Feb. 1, 2012, pp. 71-80, XP055317584, Yu.
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biometirics.html", 4 pages (Jul. 28, 2015).
Staab, Wayne J., et al., "A One-Size Disposable Hearing Aid is Introduced", The Hearing Journal 53(4):36-41) Apr. 2000.
Stretchgoal—Its Your Dash (Feb. 14, 2014).

\* cited by examiner

SELECTIVE SOUND FIELD ENVIRONMENT PROCESSING SYSTEM AND METHOD

PRIORITY STATEMENT

This application is a continuation of U.S. patent application Ser. No. 15/635,839 filed on Jun. 28, 2017 which claims priority to U.S. Provisional Patent Application No. 62/358,792 filed on Jul. 6, 2016, all of which are titled Selective Sound Field Environment Processing System and Method and all of which are hereby incorporated by reference in their entirety.

BACKGROUND

I. Field of the Disclosure

The illustrative embodiments relate to wireless earpieces. More specifically, but not exclusively, the illustrative embodiments relate to dynamically adjusting the wireless earpieces to enhance or filter desired sound input.

II. Description of the Art

The ability of an individual to respond to auditory cues in the environment is dependent upon and influenced by multiple factors. Background noise, task orientation and transient audio signals all play a significant role in an individual's functional capabilities. Each of these parameters compete for the attention of the individual. At times, there are multiple inputs which must be individually analyzed or at the very least, dealt with. Consequently, the individual may not be able to function most effectively in the environment in which they find themselves. What is needed is a new system and method for dealing with such competing audio input signals.

SUMMARY OF THE DISCLOSURE

Therefore, it is a primary object, feature, or advantage to improve over the state of the art.

It is a further object, feature, or advantage to provide an earpiece or set of earpieces which enhance the ability of an individual to focus on a person or persons.

It is a still further object, feature, or advantage to provide an earpiece or set of earpieces which provide a user with enhanced ability to function in a background noise environment.

Another object, feature, or advantage is to provide an earpiece or set of earpieces which enhance the ability to remove offending and potentially damaging sound inputs.

Yet another object, feature, or advantage of the present invention is to provide an earpiece or a set of wireless earpieces with the ability to recognize user keywords to trigger actions.

According to one aspect, a system, method and one or more wireless earpieces for active filtering is provided. Active filtering is enabled for the one or more wireless earpieces. A selection of desired audio input is received. Other audio inputs are filtered to enhance the desired audio input.

Another aspect provides a wireless earpiece. The wireless earpiece includes a frame for fitting in an ear of a user. The wireless earpiece further includes a logic engine controlling functionality of the wireless earpiece. The wireless earpiece further includes several sensors reading biometric identifiers of a user to identify the user and receive noises from an environment of the user. The logic engine enables active filtering for the one or more wireless earpieces, receives a selection of a desired audio input, and filters other audio input to enhance the desired audio input.

According to another aspect, a method for selective sound field environment processing for one or more wireless earpieces, each of the one or more wireless earpieces including comprising a plurality of microphones is provided. The method includes receiving audio input of a sound field environment from the plurality of microphones of each of the one or more wireless earpieces, identifying background noise in the sound field environment, identifying audio from at least one sound source within the sound field environment, processing the audio input using one or more processors of at least one of the wireless earpieces to reduce the background noise and processing the audio input using one or more processors of the at least one of the wireless earpieces to enhance the audio from the at least one sound source within the sound field environment to provide processed audio, and transducing the processed audio at one or more speakers of the one or more wireless earpieces. The processing the audio input may be provided using one or more processors of at least one of the wireless earpieces to reduce the background noise comprises active filtering. The sound source(s) with in the sound field environment may include the voice of one or more persons, one or more machines, or other sound sources. The one or more wireless earpieces may be configured to identify the person based on the voice of the person or the machine based on the sound of the machine.

According to another aspect, a wireless earpiece includes an earpiece housing, a processor disposed within the earpiece housing, a plurality of microphones operatively connected to the processor for receiving audio input of a sound field environment. The processor provides for executing instructions stored on a machine readable non-transitory medium for identifying background noise in the sound field environment, identifying audio from at least one sound source within the sound field environment, processing the audio input using the processor to reduce the background noise and processing the audio input using the processor to enhance the audio from the at least one sound source within the sound field environment to provide processed audio. The earpiece further includes at least one speaker operatively connected to the processor for transducing the processed audio. The at least one sound source within the sound field environment may include a voice of a person or machine. The instructions may further provide for identifying the person based on the voice of the person or the machine based on audio of the machine. The instructions may further provide for receiving an input from a user of the one or more wireless earpieces wherein the input from the user specifies the person as one of the at least one sound source. The input may be a voice input such as a voice command or keyword.

BRIEF DESCRIPTION OF THE DRAWINGS

Illustrated embodiments of the present invention are described in detail below with reference to the attached drawing figures, which are incorporated by reference herein, and where.

DETAILED DESCRIPTION OF THE DISCLOSURE

Figure 1:
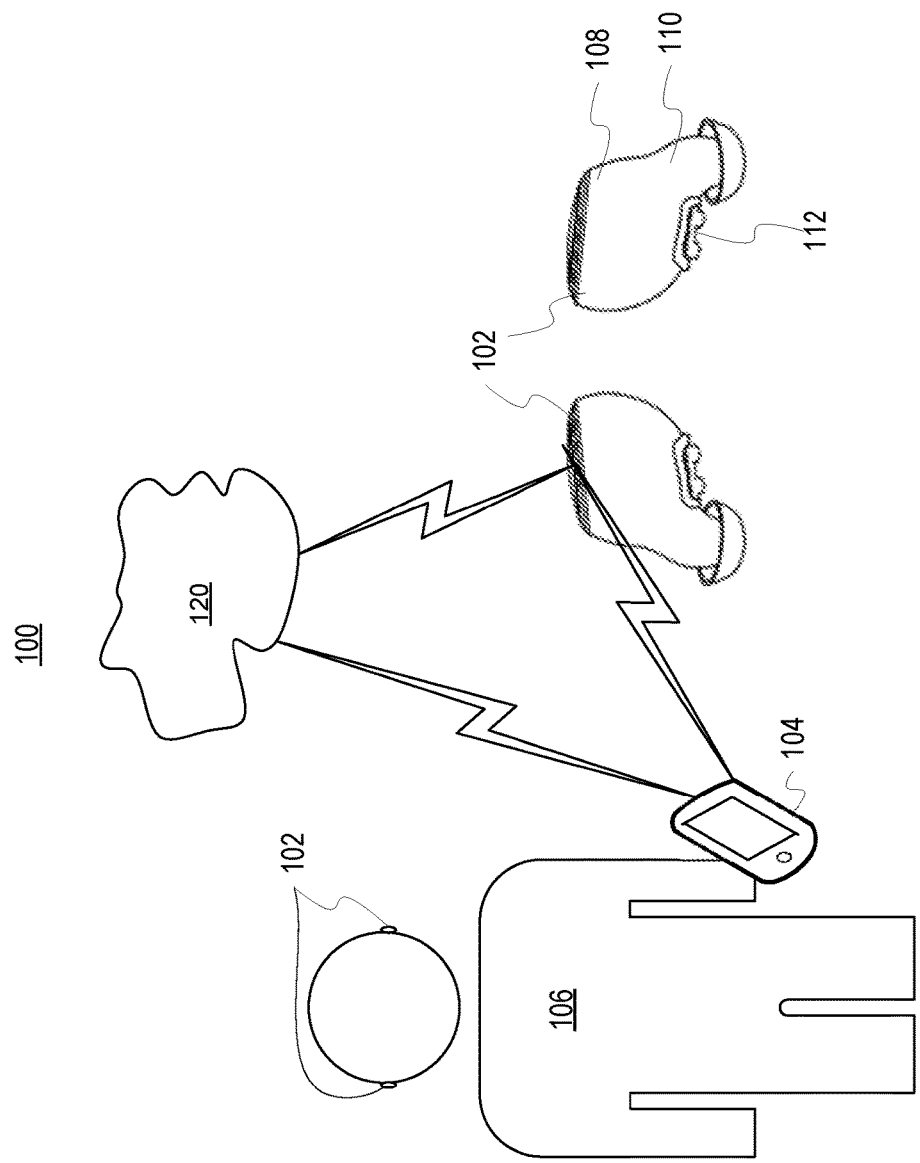
FIG. 1 is a pictorial representation of a communication environment in accordance with an illustrative embodiment.

The illustrative embodiments provide a system, method, and wireless earpieces for dynamically self-configuring the wireless earpieces in response to environmental conditions and user input. Adjusting the configuration may include filtering or enhancing sound input received from any number of sources in the environment of the user. In one embodiment, the wireless earpieces may actively filter loud, repetitive (e.g., machinery, yelling, etc.), or other noises, sounds, or inputs potentially dangerous to the hearing of the user. The wireless earpieces may also adjust the output levels of speakers, sensitivity of one or more microphones of the wireless earpieces, and other hardware and software features and functionality of the wireless earpieces. The wireless earpieces may detect noise levels of the environment and then automatically adjust the configuration of the wireless earpieces to provide the best user experience possible for specified inputs (e.g., specified voices, sounds, etc.).

In one embodiment, the wireless earpieces may decrease the output levels of background noises while enhancing user voices or specified user voices. Likewise, the sensitivity of one or more microphones of the wireless earpieces may be decreased to actively filter background and unwanted noises. The wireless earpieces may also increase the input levels of the one or more microphones and tune or increase sensitivity of one or more microphones for specified user voices, warning indicators, or other sounds in noisy environments. The wireless earpieces may automatically adapt to changing environments and conditions. At any point, the user may manually adjust the configuration or settings utilized by the wireless earpieces. Each user utilizing the wireless earpieces may have a specific user profile, the user profile may establish how dynamic configurations are performed for the wireless earpieces. For example, different voices or sounds may have different maximum speaker output levels allowed for noisy environments.

The user may provide feedback at any time to manually adjust the filtering, enhancement, or other features of the wireless earpieces (e.g., volume of the speakers, sensitivity of the microphones, etc.). In one embodiment, the wireless earpieces may learn preferences of the user over time for different enhanced inputs, filtered input, and different environmental conditions to configure the wireless earpieces for the user. For example, the wireless earpieces may learn the user typically enhances user voices in environment A and enhances machine alerts when present or in environment B. The dynamic filtering, enhancement and amplification, speaker volume, and microphone sensitivity modifications may be performed to protect the hearing of the user, and hence functionality of the wireless earpieces in all environments to best assist the user.

The wireless earpieces may be configured to recognize various sounds, such as user voices, mechanical or machine sounds, animal noises, crying, and any number of other sounds or audio signals. The sounds may be characterized by different features of the sound waves or signals as processed including loudness/intensity, quality, pitch/frequency, wavelength, source location, directionality, and so forth. In one embodiment, the wireless earpieces may sample or record specified audio inputs for analysis to filter or enhance the audio input. For example, an employee at a gun range may use wireless earpieces to filter the sound of gun shots while simultaneously enhancing sounds associated with human voices. As a result, the user may be able to walk the range talking to patrons while still protecting the hearing of the user. In another example, the user may work in a manufacturing facility and may select to filter most background noises except for alerts or alarms warning of dangers, break downs, maintenance requests, or other relevant or important information.

The wireless earpieces may provide for various types of sound source identification. The wireless earpieces may include multiple microphones on each earpiece. One of the benefits of having multiple microphones present is array-based techniques may be used to identify sound sources. Various examples of array-based techniques used include any number of beamforming techniques.

The wireless earpieces are worn in the ear of the user. For example, the wireless earpieces are configured to fit at least partially into an external auditory canal of the user. The ear canal is a rich space for obtaining biometric measurements about the user as well as stabilizing the wireless earpieces as they are worn. The wireless earpieces may be utilized during any number of rigorous physical activities requiring stability. The shape and configuration of the wireless earpieces allow the wireless earpieces to be worn for long periods of time while gathering valuable information utilizing the sensors of the wireless earpieces. The sensors of the wireless earpieces may include accelerometers, gyroscopes, microphones, camera or imaging devices, contact/conductivity sensors, pulse oximeters, and so forth. Important measurements taken by the sensors may include pulse rate, blood oxygenation, sounds, position/orientation, location, temperature, altitude, cadence, calorie expenditure, and so forth.

The wireless earpieces may include any number of sensor arrays configured to capture information about the user. The large amount of data may identify the user to dynamically adjust the configuration of the wireless earpieces based on preferences associated with the identified user. The wireless earpieces may learn over time in response to user input and historical information. Alerts may be played to the user indicating the status of the configuration adjustment process (e.g., initiated, in process, pending, awaiting verification, change made, rejected, etc.).

FIG. 1 is a pictorial representation of a communication environment 100 in accordance with an illustrative embodiment. The wireless earpieces 102 may be configured to communicate with each other and with one or more wireless devices, such as a wireless device 104. The wireless earpieces 102 may be worn by a user 106 and are shown as worn and separately from their positioning within the ears of the user 106 for purposes of visualization. A block diagram of the wireless earpieces 102 if further shown in FIG. 3 to further illustrate components and operation of the wireless earpieces 102.

In one embodiment, the wireless earpieces 102 includes a frame 108 shaped to fit substantially within the ears of the user 106. The frame 108 is a support structure at least partially enclosing and housing the electronic components of the wireless earpieces 102. The frame 108 may be composed of a single structure or multiple interconnected structures.

The frame 108 defines an extension 110 configured to fit substantially within the ear of the user 106. The extension 110 may house one or more speakers or vibration components for interacting with the user. The extension 110 may be removably covered by one or more sleeves. The sleeves may be changed to fit the size and shape of the user's ears. The sleeves may come in various sizes and have extremely tight tolerances to fit the user 106 and one or more other users utilizing the wireless earpieces 102 during their expected lifecycle. In another embodiment, the sleeves may be custom built to support the interference fit utilized by the wireless earpieces 102 while also being comfortable while worn.

In one embodiment, the frame 108 or the extension 110 (or other portions of the wireless earpieces 102) may include sensors 112 for sensing pulse, blood oxygenation, temperature, voice characteristics, skin conduction, glucose levels, impacts, activity level, position, location, orientation, as well as any number of internal or external user biometrics. In other embodiments, the sensors 112 may be internally positioned within the wireless earpieces 102. For example, the sensors 112 may represent metallic contacts, optical interfaces, or micro-delivery systems for receiving and delivering information. Small electrical charges may be sensed as well as passed through the sensors 112 to analyze the biometrics of the user 106 including pulse, skin conductivity, blood analysis, sweat levels, band so forth. Sensors 112 may also be utilized to provide a small electrical current which may be useful for alerting the user, stimulating blood flow, alleviating nausea, or so forth.

In some applications, temporary adhesives or securing mechanisms (e.g., clamps, straps, lanyards, extenders, chargers, etc.) may be utilized to ensure the wireless earpieces 102 remain in the ears of the user 106 even during the most rigorous and physical activities. In one example, a lanyard may be secured to the extensions 110 to ensure the wireless earpieces 102 are not lost if they fall from the ears of the user 106. The lanyard may be clipped to clothing or accessories of the user. A flexible charger may also be utilized to extend the battery life of the wireless earpieces 102 while securing the wireless earpieces 102 if dropped. In another example, the wireless earpieces 102 may be utilized during marathons, swimming, team sports, biking, hiking, parachuting, or so forth.

The wireless earpieces 102 may be configured to play music or audio, receive and make phone calls or other communications, determine ambient environmental conditions (e.g., temperature, altitude, location, speed, heading, etc.), read user biometrics (e.g., heart rate, motion, temperature, sleep, blood oxygenation, voice output, calories burned, forces experienced, etc.), and receive user input, feedback, or instructions. The wireless device 104 or the wireless earpieces 102 may communicate directly or indirectly with one or more wired or wireless networks, such as a network 120. The wireless earpieces 102 may include logic for dynamically configuring components of the wireless earpieces 102, such as speakers and microphones, to the conditions of the communication environment 100.

The wireless earpieces 102 may determine their position with respect to each other as well as the wireless device 104. For example, position information for the wireless earpieces 102 and the wireless device 104 may determine proximity of the devices in the communication environment 100. For example, global positioning information, wireless triangulation, or signal strength/activity may be utilized to determine proximity and distance of the devices to each other in the communication environment 100. In one embodiment, the distance information may be utilized to determine whether the wireless earpieces 102 are both being worn (e.g., should be experiencing similar environmental conditions, noise, etc.). Sound propagation (e.g., time delay, reflections, etc.) may also be utilized to determine the position, location, or distance of the user, sounds sources, and other objects within the environment 100. As a result, dynamic enhancements and filtering may be adjusted based on the conditions, factors, position, and location of the user within the environment 100.

In one embodiment, the wireless earpieces 102 and the corresponding sensors 112 (whether internal or external) may be configured to take several measurements or log information during normal usage. The sensor measurements may be utilized to extrapolate other measurements, factors, or conditions applicable to the user 106. For example, the sensors 112 may monitor the user's heartbeat or EKG to determine the user's unique pattern or characteristics. The user 106 or another party may configure the wireless earpieces 102 directly or through a connected device and app (e.g., mobile app with a graphical user interface) to store or share information, audio, images, and other data. Some examples of standard usage may include detecting and recording a heartbeat, setting a biometric for transaction authentication, setting noise thresholds and the associated speaker volume level or microphone sensitivity, setting a gesture/input for performing an action (e.g., playing music, opening an application, providing an audio indication of biometric feedback, etc.), active participation in a conversation, listening to music, or so forth.

The wireless earpieces 102 may reconfigure themselves during an initial set up process, during start up, during regular use, or in response to a user request. In one embodiment, each of the sensors 112 of the wireless earpieces 102 may perform baseline readings to determine readings when the communications environment 100 is quiet, slightly noise, and loud. For example, the communications environment 100 may include the user's home, commute, work out areas, office, mechanical shop, sports venue, and so forth without limitation. In one embodiment, the wireless earpieces 102 may determine a default configuration for the speakers and microphones based on a determined location. The speakers and microphones may then be further self-adjusted based on the real-time noise levels, individual voices, or other specified inputs in the determined location to adjust to the optimal configuration for the wireless earpieces 102 including filtering and enhancing sounds.

The wireless earpieces 102 may include any number of sensors 112 and logic for measuring and determining user biometrics, such as pulse rate, skin conduction, blood oxygenation, temperature, calories expended, voice and audio output, position, and orientation (e.g., body, head, etc.). The sensors 112 may also determine the user's location, position, velocity, impact levels, and so forth. The sensors 112 may also receive user input and convert the user input into commands or selections made across the personal devices of the personal area network. For example, the user input detected by the wireless earpieces 102 may include voice commands, head motions, finger taps, finger swipes, motions or gestures, or other user inputs sensed by the wireless earpieces. The user input may be measured by the wireless earpieces 102 and converted into internal commands or external commands potentially sent to one or more external devices, such as the wireless device 104, a tablet computer, or so forth. For example, the user 106 may create a specific head motion and voice command when detected by the wireless earpieces 102 are utilized to automatically adjust to noise levels in the communications environment 100 or increase or decrease the volume.

The sensors 112 may make all the measurements regarding the user 106 or may communicate with any number of other sensory devices in the communication environment 100 to measure information and data about the user 106 as well as the communication environment 100 itself. In one embodiment, the communication environment 100 may represent all or a portion of a personal area network. The wireless earpieces 102 may be utilized to control, communicate, manage, or interact with several other wearable devices or electronics, such as smart glasses, helmets, smart glass, watches or wrist bands, other wireless earpieces, chest straps, implants, displays, clothing, or so forth. A personal area network is a network for data transmissions among devices, such as personal computing, communications, camera, vehicles, entertainment, and medical devices. The personal area network may utilize any number of wired, wireless, or hybrid configurations and may be stationary or dynamic. For example, the personal area network may utilize wireless network protocols or standards, such as INSTEON, IrDA, Wireless USB, Bluetooth, Z-Wave, ZigBee, Wi-Fi, ANT+ or other applicable radio frequency signals. In one embodiment, the personal area network may move with the user 106.

In other embodiments, the communication environment 100 may include any number of devices, components, or so forth potentially communicating with each other directly or indirectly through a wireless (or wired) connection, signal, or link. The communication environment 100 may include one or more networks and network components and devices represented by the network 120, such as routers, servers, signal extenders, intelligent network devices, computing devices, or so forth. In one embodiment, the network 120 of the communication environment 100 represents a personal area network as previously disclosed. The network 120 may also represent several different network types and service providers.

Communications within the communication environment 100 may occur through the network 120 or may occur directly between devices, such as the wireless earpieces 102 and the wireless device 104, or indirectly through a network, such as a Wi-Fi network. The network 120 may communicate with or include a wireless network, such as a Wi-Fi, cellular (e.g., 3G, 4G, 5G, PCS, GSM, etc.), Bluetooth, or other short range or long-range radio frequency network. The network 120 may also include or communicate with any number of hard wired networks, such as local area networks, coaxial networks, fiber-optic networks, network adapters, or so forth. Communications within the communication environment 100 may be operated by one or more users, service providers (e.g., secure, public, private, etc.), or network providers.

The wireless earpieces 102 may play, communicate, or utilize any number of alerts or communications to indicate the status of the self-configuration process including filtering or enhancing audio signals. For example, one or more alerts may indicate when dynamic adjustments are pending (e.g., self and exterior analysis), in process, require user interaction, and/or are being executed with specific tones, verbal acknowledgements, tactile feedback, or other forms of communicated messages. For example, an alert may be played when a specified user's voice is detected and enhanced. Likewise, any time filtering is performed to remove dangerous sounds, an alert may be played to the user 106 so the user 106 is aware of the hearing danger the user 106 and others may be experiencing. The corresponding alert may also be communicated to the user 106, and the wireless device 104.

In other embodiments, the wireless earpieces 102 may also vibrate, flash, play a tone or other sound, or give other indications of the automatic self-configuration process status to prompt user actions (e.g., providing a manual adjustment, select a filtering level, provide additional feedback, etc.) or implement any number of associated steps. The wireless earpieces 102 may also communicate an alert to the wireless device 104 showing up as a notification, message, or other indicator indicating the necessity for configuration/re-configuration or a changed status of the configuration process, such as an audio alert, "the volume has been automatically adjusted for dangerous background noise."

The wireless earpieces 102 as well as the wireless device 104 may include logic for automatically implementing self-configuration and set-up for self-configuration in response to wireless earpiece set-up, start-up, condition changes (e.g., location, activities, etc.), event happenings, user requests or various other conditions and factors of the communication environment 100. For example, the wireless device 104 may communicate instructions received from the wireless earpieces 102 for the user 106 to provide feedback if the user does not agree with the filtering or enhancement performed by the wireless earpieces 102. The wireless device 104 (or the wireless earpieces 102) may include an application displaying, playing, or communicating instructions and information to the user 106 in response to configuration being needed or required. The application may allow the user 106 to specify or record voices, sounds, or other audio to be filtered or enhanced (e.g., signal processing, amplification, etc.). For example, the application may perform intensity, frequency, wavelength, time delay, and other analysis for any number of audio inputs to recognize the sounds in the future. As a result, the wireless earpieces 102 may perform automatic enhancements or filtering in response to any number or combination of specified conditions, such as location, noise or sound thresholds, detection of or proximity to an individual, animal, or machine, user activity, and so forth. The user 106 may specify preferences for implement the enhancements and filtering as are herein described.

In one embodiment, the wireless device 104 may utilize short-range or long-range wireless communications to communicate with the wireless earpieces 102 through a wireless signal or devices of the communication environment 100. For example, the wireless device 104 may include a Bluetooth and cellular transceiver within the embedded logical components. For example, the wireless signal may be a Bluetooth, Wi-Fi, ZigBee, Ant+, near-field magnetic induction (NFMI), or other short-range wireless communication.

The wireless device 104 may represent any number of wireless or wired electronic communications or computing devices, such as smart phones, laptops, desktop computers, control systems, tablets, displays, gaming devices, music players, personal digital assistants, vehicle systems, or so forth. As noted, the wireless device 104 may communicate utilizing any number of wireless connections, standards, or protocols (e.g., near field communications, NFMI, Bluetooth, Wi-Fi, wireless Ethernet, etc.). For example, the wireless device 104 may be a touch screen cellular phone communicating with the wireless earpieces 102 utilizing Bluetooth communications. The wireless device 104 may implement and utilize any number of operating systems, kernels, instructions, or applications potentially making use of the available sensor data sent from the wireless earpieces 102. For example, the wireless device 104 may represent any number of android, iOS, Windows, open platforms, or other systems and devices. Similarly, the wireless device 104 or the wireless earpieces 102 may execute any number of applications utilizing the user input, proximity data, biometric data, and other feedback from the wireless earpieces 102 to initiate, authorize, or perform configuration and the associated tasks.

As noted, the layout of the internal components of the wireless earpieces 102 and the limited space available for a product of limited size may affect where the sensors 112 and other components may be positioned. The positions of the sensors 112 within each of the wireless earpieces 102 may vary based on the model, version, and iteration of the wireless earpiece design and manufacturing process.

Figure 2:
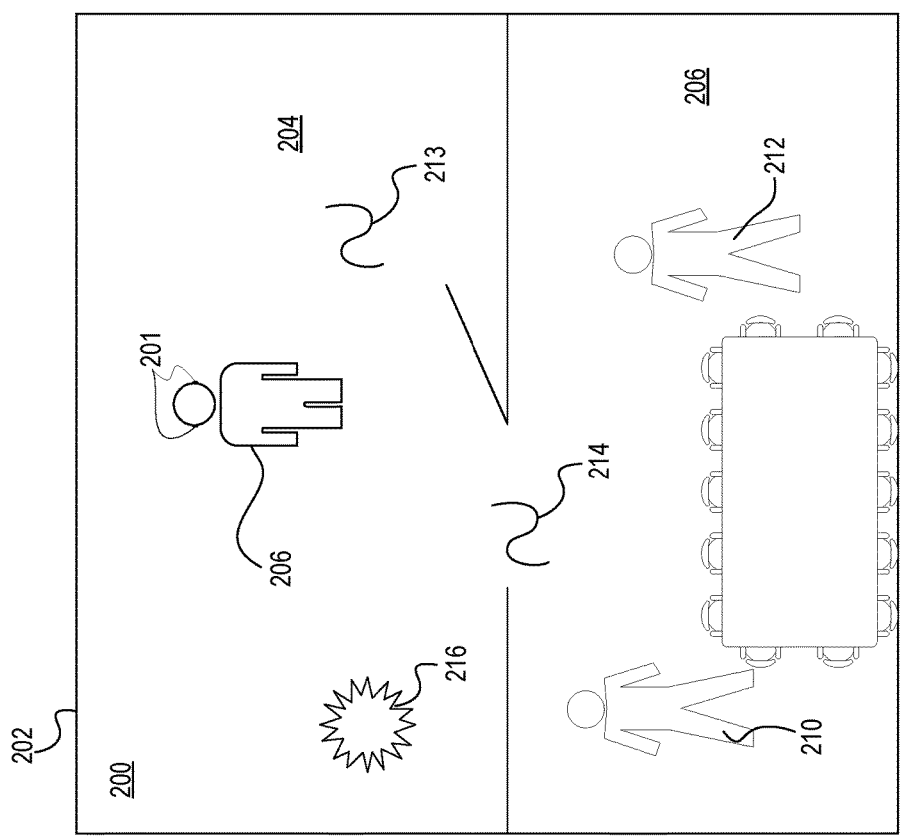
FIG. 2 is a pictorial representation of another communications environment in accordance with an illustrative embodiment.

FIG. 2 is a pictorial representation of another communications environment 200 in accordance with an illustrative embodiment. The communications environment 200 is utilized to show an environment in which a user 201 may be affected by any number of sounds, noises, or audio input. For example, the communications environment 200 may vary between noisy and quiet. In one embodiment, a location 202 is shown within the communications environment 200. The communications environment 200 may include sections 204, 206, a user 208, individuals 210, 212, and noise 214.

The communications environment 200 is one example of many potential environments where wireless earpieces 201 may be utilized. For example, the wireless earpieces 201 may be utilized in any number of indoor and outdoor conditions. The wireless earpieces 201 may be utilized for work or commercial purposes, exercise or sports, recreational activities, relaxing, or in any number of other locations or situations.

In one example, the wireless earpieces 201 may be utilized in the location 202. For example, the location 202 may represent a home, building, office space, dwelling, sports venue, school, or so forth. The user 206 may enter the location 202 and begin using the wireless earpieces 201 in the section 204. The section 204 may represent a location where the user is utilizing the wireless earpieces 201, such as an office, recreational space, commercial area, cafeteria, classroom, workspace, or so forth. The noise levels within the section 204 may vary based on other individuals, such as individuals 210, 212, machinery, activities, events, or other man-made or natural noises.

In one embodiment, the noise level of the location 202 as well as the sections 204, 206 may increase in response to the individuals 210, 212 utilizing the section 206. For example, the individuals 210, 212 may be participating in a meeting, conference call, sporting activity, discussion, or other activity increasing the noise levels within the location 202. The individuals 210, 212 as well as the equipment, devices, and natural sounds of the sections 204, 206 may generate noise 213. In one embodiment, the user may select to focus on the audio input 214. In one embodiment, the user may provide an input or selection to actively enhance or filter the voice of the user 210. For example, the user 206 may provide a verbal command to "focus on Jill" who may represent the user 210 speaking the audio input 214. As a result, the wireless earpieces 201 may 1) amplify the audio input 214, 2) clarify and amplify the audio input 214 (e.g., signal processing to clean up the audio signal, etc.), and/or 3) filter the other noises 213 (e.g., background noises, dangerously loud noises, etc.). In one example, the audio input 214 may represent the speech or vocalizations of user 210. For example, the user 210 may be the supervisor of user 206. Thus, user 206 may desire or select to enhance the speech of the user 210.

In other examples, the audio input 214 may represent warnings from equipment in the section 206 separated from the location of the user 206. The noise 214 may affect the effectiveness of the wireless earpieces 201 in playing or communicating content, information, and data to the user 206. As a result, the noise 214 may be filtered by the wireless earpieces 201. The noises 214 may also be repetitive, loud, or other noises the wireless earpieces 201 may remove, reduce in volume, or otherwise modify to protect the user 206.

In one embodiment, the location 202 may also experience audio input 216. In one embodiment, the audio input 216 may be a noise or audio dangerous to the hearing of the user 206. As a result, the wireless earpieces 201 may filter the audio input 216 so it is not communicated or played to the user 206 through the wireless earpieces 201. The audio input 216 may represent one-time noises (e.g., explosions, thunder, etc.) as well as repetitive noises (e.g., machinery, speakers, etc.). In one example, the wireless earpieces 201 may automatically filter or eliminate sounds over 85 dB potentially causing permanent hearing damage. Any number of thresholds (e.g., high and low) may be utilized to protect the user 206. The user 206 may also be protected from subliminal messages or other unknown audio sources potentially communicating unknown or dangerous communications.

In one embodiment, the wireless earpieces 201 may actively filter the audio input 216 to remove or dampen the audio input 216 to acceptable levels communicated through the wireless earpieces 201. In another embodiment, the wireless earpieces 201 may act as advanced ear plugs preventing the audio input 216 from passing directly into the ears of the user 206. For example, all audio through the wireless earpieces 201 may be momentarily stopped when the audio input 216 is generated. In yet another embodiment, the wireless earpieces 201 may generate a noise cancelling signal to further reduce the effect of the audio input 216 if transmitted through the body and head of the user 206. The noise cancelling signal may further reduce the danger to the user 206. The wireless earpieces 201 may be sized and shaped to fit users of all ages (e.g., children, adults, seniors, etc.) and with differing ear shapes and anatomy.

In one example, the wireless earpieces 201 may be utilized by the user 206 near a printing press to effectively eliminate the noise 213 potentially associated with the mechanical operation of the printing press while still allowing the user 206 to verbally communicated with the users 210, 212. As a result, the repetitive sounds. As a result, the wireless earpieces 201 may detect the noise 213 within the location 202, analyze the noise 213, and configure the wireless earpieces 201 to provide the best experience to the user 206 utilizing the wireless earpieces 201 while the noise 213 is present. For example, if the individuals 210, 212 are having a loud discussion while the user 206 is utilizing the wireless earpieces 201 to have phone conversation, the wireless earpieces 201 may detect the noise 213 and automatically increase the volume levels of the speakers of the wireless earpieces 201 as well as increasing the microphone sensitivity of the wireless earpieces 201 better detecting the voice of the user 206 (as well as the audio input 214 in some embodiments). The wireless earpieces 201 may also perform filtering or noise cancellation of the noise 213 to enhance the experience of the user 206.

Likewise, the wireless earpieces 201 may decrease the volume of the speakers and the microphone sensitivity of the wireless earpieces 201 in response to determining the audio input 214 has decreased significantly. The wireless earpieces 201 may utilize any number of thresholds to determine how the wireless earpieces 201 are configured to adapt to the communications environment 200. As a result, the experience of the user 206 utilizing the wireless earpieces 201 may be dynamically adapted to communicate desired audio input(s) to the user 206.

In another example, the amount of the noise 214 detected by the wireless earpieces 201 may vary between the section 204 and the section 206. The wireless earpieces 201 may adjust the volume level of the speakers as well as the microphone sensitivity as the user 206 moves within the location 202 for the audio inputs 214, 216 and the noise 213. The wireless earpieces 201 may also include preconfigured settings utilized for specified locations, activities, or so forth. As a result, the user 206 may have the best experience possible with the wireless earpieces 201 during their utilization.

As noted, the wireless earpieces 201 may be configured automatically, manually by the user 206, or in response to user input to selectively filter and enhance the various sounds, noises, and inputs of the location 202 (as well as other locations). In one embodiment, the wireless earpieces 201 may be configured to recognize the speech of the user 210 as detected as the audio input 214 for enhancement. Likewise, the noises 213 and audio input 216 may be recognized for filtering or blocking.

Figure 3:
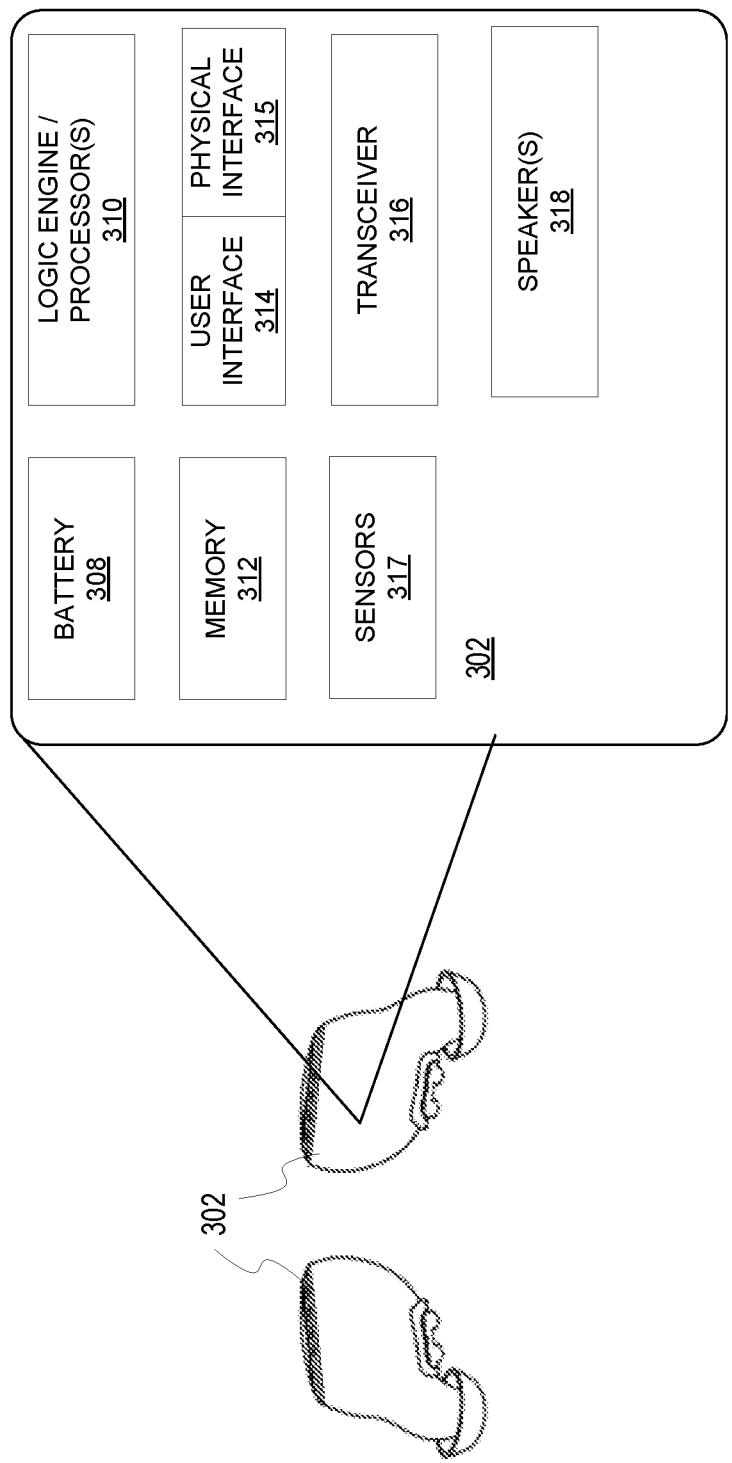
FIG. 3 is a block diagram of wireless earpieces in accordance with an illustrative embodiment.

FIG. 3 further illustrates a block diagram of the wireless earpieces 302. As noted, the components of the wireless earpieces 302 may be described collectively rather than individually. The wireless earpieces 302 may be wirelessly linked to any number of wireless devices (not shown), such as the wireless device 104 of FIG. 1. For example, wireless devices may include wearable devices, communications devices, computers, entertainment devices, vehicle systems, exercise equipment, construction or troubleshooting equipment, or so forth. Sensor measurements, user input, and commands may be received from either the wireless earpieces 302 or the wireless device for processing and implementation on either of the devices (or other externally connected devices). Reference to the wireless earpieces 302 may descriptively or functionally refer to either the pair of wireless earpieces (wireless earpieces) or individual wireless earpieces (left wireless earpiece and right wireless earpiece) without limitation.

In some embodiments, the wireless device may also act as a logging tool for sensor data or measurements made by the wireless earpieces 302. For example, the wireless device may receive and share data captured by the wireless earpieces 302 in real-time including biometric information, such as a status of the user (e.g., physical, emotional, etc.). As a result, the wireless device may be utilized to store, display, and synchronize sensor data received from the wireless earpieces 302. For example, the wireless device may display user pulse rate, temperature, proximity, location, blood oxygenation, distance, calories burned, and so forth as measured by the wireless earpieces 302. The wireless device may also store information regarding known or typical conditions (e.g., noise levels, environmental conditions, etc.) for specific locations potentially utilized to perform sensor calibration or biasing. The wireless earpieces 302 may also temporarily or permanently store this information and data in the memory 312 for utilization, logging, historical information, or any number of other uses or purposes. The wireless device may be configured to receive and display alerts indicating when calibration has been initiated, processed, and completed.

In one embodiment, the wireless earpieces 302 may include a battery 308, a logic engine 310, a memory 312, a user interface 314, a physical interface 315, a transceiver 316, and sensors 317. The wireless earpieces 302 and the wireless device may have any number of electrical configurations, shapes, and colors and may include various circuitry, connections, and other components utilized to perform the illustrative embodiments.

The battery 308 is a power storage device configured to power the wireless earpieces 302. In other embodiments, the battery 308 may represent a fuel cell, thermal electric generator, piezo electric charger, solar charger, ultra-capacitor, or other existing or developing power storage technologies. The sensors 317 may also be utilized to measure the condition of internal components of the wireless earpieces 302, such as the temperature of the battery 308. The sensors 317 may also be utilized to determine data about external conditions and factors applicable to the user, the user's environment, a communicating wireless device, or so forth. Other conditions and factors sensed by the sensors 317 (e.g., water/humidity, pressure, blood oxygenation, noise levels, blood content levels, altitude, position, impact, radiation, etc.) may also be determined with the data being processed by the logic engine 310.

The logic engine 310 is the logic controlling the operation and functionality of the wireless earpieces 302. The logic engine 310 may include circuitry, chips, and other digital logic. The logic engine 310 may also include programs, scripts, and instructions potentially implemented to operate the logic engine 310. The logic engine 310 may represent hardware, software, firmware, or any combination thereof. In one embodiment, the logic engine 310 may include one or more processors. The logic engine 310 may also represent an application specific integrated circuit (ASIC) or field programmable gate array (FPGA). The logic engine 310 may utilize sensor measurements, user input, user preferences and settings, conditions, factors, and environmental conditions to determine the identity of the user, at least in part, from measurements performed by the wireless earpieces 302. The identity of the user may be utilized by the logic engine 310 to manage specific configuration of the sensors 317 as well as enabling enhancement or filtering options. For example, the logic engine 310 may detect conditions potentially necessitating increasing the amplification or volume for a voice input, such as the voice of user dropping below a threshold, and then send a command to amplifiers or speakers of the wireless earpieces 302 to increase the volume/amplitude of the voice input played by the speakers. The filtering, enhancement, volume levels, and thresholds utilized may vary based on the user identified as utilizing the wireless earpieces 302 at any given time.

In one embodiment, the logic engine 310 may manage the self-configuration based on user preferences and measurements and data from the sensors 317 as well as other connected devices. The logic engine 310 may also perform any number of mathematical functions (e.g. linear extrapolation, polynomial extrapolation, conic extrapolation, French curve extrapolation, polynomial interpretation, etc.) to determine or infer the correct sensor configuration, volume adjustments, microphone sensitivity, biasing, or adjustments potentially required. The logic engine 310 may utilize historical measurements, trends, component degradation or failures, time, and other sensor measurements as causal forces to enhance a mathematical function utilized to perform the determinations, processing, and extrapolation performed by the logic engine 310.

The logic engine 310 may also process user input to determine active filtering and enhancement commands implemented by the wireless earpieces 302 or sent to the wireless earpieces 302 through the transceiver 316. Specific configuration commands or activities may be allowed based on sensor measurements, events, environmental conditions, proximity thresholds, locations, and so forth. For example, the logic engine 310 may implement a configuration process macro allowing the user to accept or reject enhancement for a specified user's voice in response to 1) noise levels reaching a threshold, 2) participating in a specified activity (e.g., biking, concert, work, etc.), or being at a specific location (e.g., work, school, church, music performance, etc.).

In one embodiment, a processor included in the logic engine 310 is circuitry or logic enabled to control execution of a set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks.

The memory 312 is a hardware element, device, or recording media configured to store data or instructions for subsequent retrieval or access later. The memory may be a non-transitory machine-readable storage media. The memory 312 may represent static or dynamic memory. The memory 312 may include a hard disk, random access memory, cache, removable media drive, mass storage, or configuration suitable as storage for data, instructions, and information. In one embodiment, the memory 312 and the logic engine 310 may be integrated. The memory may use any type of volatile or non-volatile storage techniques and mediums. The memory 312 may store information related to the user, wireless earpieces 302, wireless device 304, and other peripherals, such as smart glasses, smart watch, smart case for the wireless earpieces 302, wearable device, and so forth. In one embodiment, the memory 312 may display or communicate instructions, programs, drivers, or an operating system for controlling the user interface 314 including one or more LEDs or other light emitting components, speakers, tactile generators (e.g., vibrator), and so forth. The memory 312 may also store user profiles, biometric readings, user input required for active filtering and enhancements processes, configuration data (e.g., default, standard, baseline, factory programmed, preset, normative data regarding noise thresholds—utilized for comparisons), user settings and preferences, thresholds, conditions, signal or processing activity, historical information, proximity data, and so forth.

The transceiver 316 is a component comprising both a transmitter and receiver which may be combined and share common circuitry on a single housing. The transceiver 316 may communicate utilizing NFMI, Bluetooth, Wi-Fi, Zig-Bee, Ant+, near field communications, wireless USB, infrared, mobile body area networks, ultra-wideband communications, cellular (e.g., 3G, 4G, 5G, PCS, GSM, etc.), infrared, or other suitable radio frequency standards, networks, protocols, or communications. For example, the transceiver 316 may coordinate communications and actions between the wireless earpieces 302 utilizing NFMI communications. The transceiver 316 may also be a hybrid transceiver supporting several different communications. For example, the transceiver 316 may communicate with wireless devices or other systems utilizing wired interfaces (e.g., wires, traces, etc.), NFC or Bluetooth communications. The transceiver 316 may also detect amplitudes and infer distance between the wireless earpieces 302 and external devices, such as the wireless device or a smart case of the wireless earpieces 302.

The components of the wireless earpieces 302 may be electrically connected utilizing any number of wires, contact points, leads, busses, wireless interfaces, or so forth. In addition, the wireless earpieces 302 may include any number of computing and communications components, devices or elements which may include busses, motherboards, circuits, chips, sensors, ports, interfaces, cards, converters, adapters, connections, transceivers, displays, antennas, and other similar components. The physical interface 315 is hardware interface of the wireless earpieces 302 for connecting and communicating with wireless devices or other electrical components, devices, or systems. For example, synching and charging may be performed by an external device through the physical interface 315.

The user interface 314 is a hardware interface for receiving commands, instructions, or input through the touch (haptics) of the user, voice commands, or predefined motions. For example, the user interface 314 may include a touch screen or sensors (including a fingerprint scanner), one or more cameras or image sensors, microphones, speakers, and so forth. One or more speakers 318 may include several speaker components (e.g., signal generators, amplifiers, drivers, and other circuitry) configured to generate sounds waves at distinct frequency ranges (e.g., bass, woofer, tweeter, midrange, etc.) or to vibrate at specified frequencies to be perceived by the user as sound waves. The speakers 318 may also generate interference signals potentially counteracting audio signals externally sensed by the sensors 317 and processed by the logic engine 310. The user interface 314 may be utilized to control the other functions of the wireless earpieces 302. The user interface 314 may include the LED array, one or more touch sensitive buttons or portions, a miniature screen or display, or other input/output components. The user interface 314 may be controlled by the user or based on commands received from the wireless device. For example, the user may adjust or cancel active filtering and/or enhancement performed by the wireless earpieces 300 utilizing the user interface 314.

The one or more microphones of the user interface 314 may include an internal or ear bone microphone receiving conduction of sound to the microphone through the bones of the skull. The internal microphone may also represent any number of other microphone types utilized to sense the user's voice, external noise, and so forth. The ear bone microphone may be positioned so it is within the ear of the user when the wireless earpieces 302 are being worn. The user interface 314 may also include an external microphone measuring noise levels outside the wireless earpieces 302. The external noise levels may be utilized to configure the wireless earpieces 302 including the filtering, enhancements, volume levels, and sensitivity of the internal or ear bone microphone.

In one embodiment, the biometric data of the user may be encrypted and stored within a secure portion of the memory 312 to prevent unwanted access or hacking. The wireless earpieces 302 may also store important user profile and biometric data, such as medical information (e.g., medical conditions, allergies, logged biometrics, contacts, etc.) and identifying biometric information, for sharing in response to an emergency or authenticated request. The profile may store information about when, where, and how active enhancement and filtering of audio is performed by the wireless earpieces 300. For example, the user may specify certain voices, sounds, or audio to be filtered or enhanced, activities or environments during which filtering and/or enhancement are performed, user input or commands utilized to implement enhancement and/or filtering (e.g., head motions, taps, swipes, or other contact with the wireless earpieces 300, voice commands, in-app selections, etc.), priorities for implementing filtering and enhancement in complex sound environments, and preferences for distinct users potentially utilizing the wireless earpieces 300.

The dynamic processing of audio content may be performed automatically in response to conditions and factors detected by the wireless earpieces 302. However, in other embodiments, the user may provide user feedback for initiating a configuration process by tapping the user interface 314 once, twice, three times, or any number of times. Similarly, a swiping or specific motion may be utilized across or in front of the user interface 314 (e.g., the exterior surface of the wireless earpieces 302) to implement a predefined action. Swiping motions in any number of directions or gestures may be associated with specific or broad filtering and enhancements as well as other activities, such as share exercise data, share music playlist, share vitals, play music, pause, fast forward, rewind, activate a digital assistant (e.g., Siri, Cortana, smart assistant, etc.), or so forth without limitation. The swiping motions may also be utilized to control actions and functionality of wireless devices or other external devices (e.g., smart television, camera array, smart watch, etc.). The user may also provide user input for authorizing or initiating a configuration process by moving his head in a direction or motion or based on the user's position, orientation, or location. The user may utilize voice commands, head gestures, or touch commands to control the wireless earpieces 300. For example, the user may say "listen to Mark" to automatically reconfigure the volume levels of the speakers and adjust the sensitivity of the microphone to Mark's voice (e.g., Mark's voice may have previously been established for enhancement). The user may be changing between activities (e.g., running, biking, swimming, etc.) and may want the sensors 317 and logic engine 310 to be specifically configured for the activity. The user interface 314 may also provide a software interface including any number of icons, soft buttons, windows, links, graphical display elements, and so forth.

In one embodiment, the user interface 314 may periodically utilize one or more microphones and speakers of the wireless earpieces 302 to authenticate or identify the user, other users, sounds, or other audio input. The microphone of the user interface 314 may measure various voice characteristics including amplitude, shimmer rates (i.e., changes in amplitude over time) frequency/pitch, jitter rates (i.e., changes in frequency data over time), accent, voice speed, inflection, and so forth. The wireless earpieces 302 may also recognize a pre-defined vocabulary, words, passwords, or phrases for authentication. For example, specific words may be required to authenticate the user and specific data associated with the user (e.g., fit of the wireless earpieces, baseline configuration readings, user preferences, etc.). The wireless earpieces 302 may also indicate or confirm the identity of the user for verification utilizing the one or more speakers of the user interface 314. The wireless earpieces 302 may also audibly confirm any number of actions, commands, activities, features, or processes performed by the wireless earpieces (e.g., initiated, status, continuing, terminating, etc.).

The sensors 317 may include pulse oximeters, accelerometers, gyroscopes, magnetometers, water, moisture, or humidity detectors, impact/force detectors, thermometers, inertial sensors, photo detectors, miniature cameras, microphones, and other similar instruments for detecting the user's status and environmental conditions as well as location, utilization of the wireless earpieces 302, orientation, motion, and so forth. The sensors 317 may also be utilized to determine the biometric, activity, location, and speed measurements of the user. In one embodiment, the sensors 317 may store data potentially shared with other components (e.g., logic engine 310 implementing a configuration process), users, and devices.

The sensors 317 may also include photodetectors, ultrasonic mapping devices, or radar scanning the ear of the user when positioned for utilization. The sensors 317 may generate a two or three-dimensional scan or topography map of the user's ear and surrounding areas when the wireless earpieces 302 are properly positioned. The mapping may include the internal and/or external portions of the user's ear. The topographical image of the user's ear may be utilized as a stand-alone biometric identifier or may be utilized with other biometric identifiers to identify the user. The topographical image may also be utilized to perform configuration based on the determined position, orientation, and fit of the wireless earpieces 302 and sensors 317. The image may include the external auditory meatus, scapha, fossa triangularis, scaphoid fossa, helix, antihelix, antitragus, lobule, the tragus, and pinna as well as other internal or external portions of the ear and surrounding head structure.

The sensors 317 may pass measurements, readings, and data to the logic engine 310 for performing configuration processes and algorithms. Likewise, the memory 312 may store the configuration programs, algorithms, steps, baseline data, sensor measurement data, and so forth. This data and information may also be communicated to a connected device for storage or analysis. The sensor measurements may be compared against the baseline data to determine variations and how to compensate or adjust the wireless earpieces 302 based on the sensor measurements. The sensors 317 may also measure a noise floor of the sensors for each sensor of the wireless earpieces 302. The noise floor may be the measure of the signal created from the sum of all the noise sources and unwanted signals for each of the sensors 317 within each of the wireless earpieces 302. The noise floor may be calculated for various environments, locations, and positions all of which may affect the sensors 317. The logic engine 310 may also perform pattern analysis with the sensor measurements to calibrate or tune the sensors 317 based on established patterns or information.

Externally connected wireless devices may include components similar in structure and functionality to those shown for the wireless earpieces 302. For example, a wireless device may include any number of processors, batteries, memories, busses, motherboards, chips, transceivers, peripherals, sensors, displays, cards, ports, adapters, interconnects, sensors, and so forth. In one embodiment, the wireless device may include one or more processors and memories for storing instructions. The instructions may be executed as part of an operating system, application, browser, or so forth to implement the features herein described. For example, the user may set preferences for the wireless earpieces 302 to perform configuration based on specified events, locations, activities, or user input. Likewise, the preferences may manage the actions taken by the wireless earpieces 302 in response to identifying specific users utilizing the wireless earpieces 302. For example, a parent user may require a first configuration process for filtering outside noises to protect hearing of the parent while a juvenile user may have a second configuration process to enhance the voice of the parent when speaking to the juvenile (in addition the volume level of music played may also be capped for the juvenile user or other users to prevent hearing loss or damage). In one embodiment, the wireless earpieces 302 may be magnetically or physically coupled to the wireless device to be recharged or synchronized.

The wireless device may also execute an application with settings or conditions for self-configuration, updating, synchronizing, sharing, saving, identifying, calibrating, and utilizing biometric and environmental information as herein described. For example, one of the sensors 317 potentially failing may be ignored in response to improper or unreliable data being gathered. As a result, the user identification process for configuration process authorization may be dynamically performed utilizing any combination of sensor measurements and the measurements of environmental conditions may likewise be adapted. For example, the number and position of the sensors 317 utilized to perform sensor measurements of the user may vary based on failures, inaccurate data, or other temporary or permanent issues with hardware and software of the wireless earpieces 302.

Figure 4:
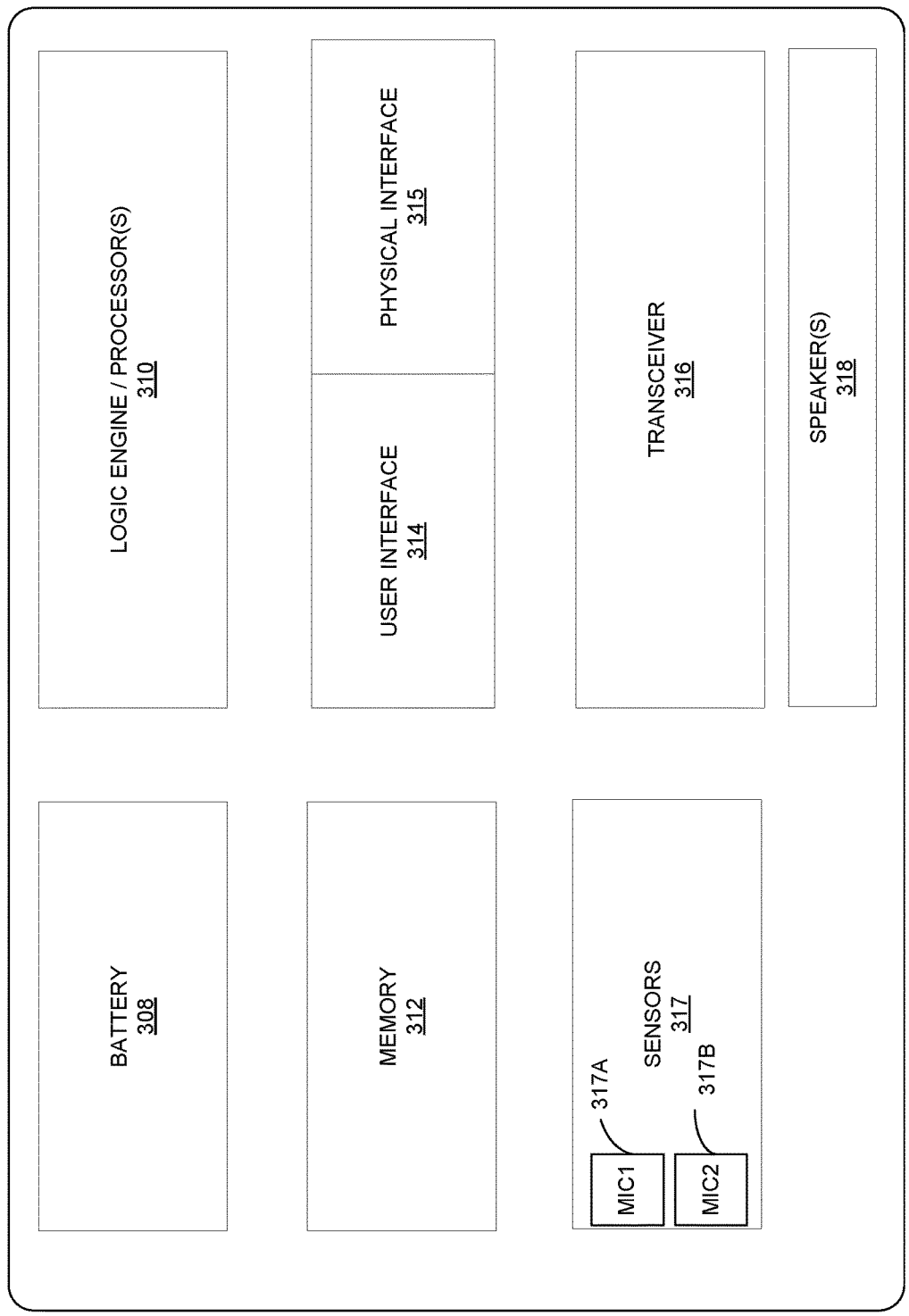
FIG. 4 is a block diagram showing components within an earpiece housing.

FIG. 4 is a block diagram showing the earpiece components disposed within the earpiece housing. The block diagram is the same as wireless earpieces 302 included within FIG. 3, except a plurality of microphones 317A, 317B are specifically shown as two of the sensors 317. It is to be understood two or more microphones may be present in each earpiece. One of the benefits of having multiple microphones present is the array-based techniques may be used to identify sound sources. Various examples of array-based techniques may be used including any number of beamforming techniques.

Figure 5:
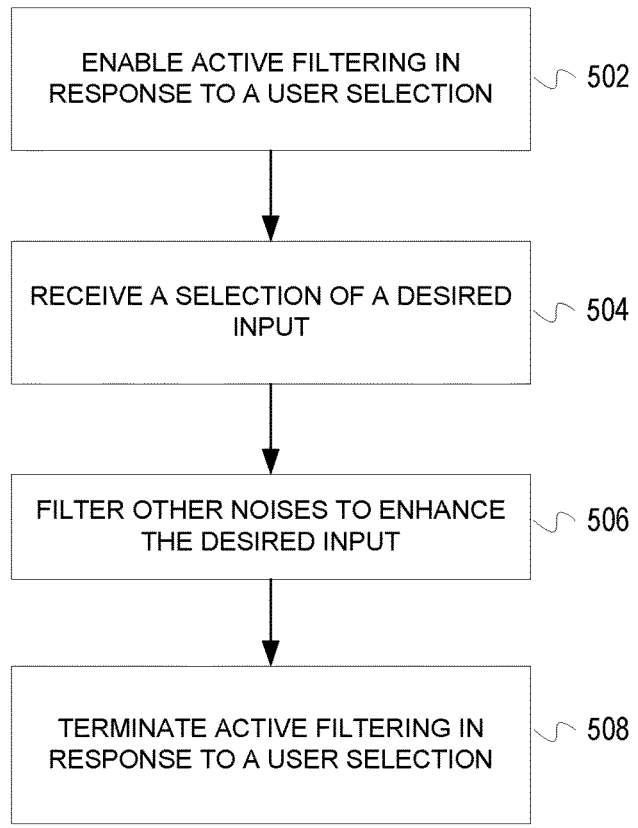
FIG. 5 is a flowchart of a process for performing active filtering utilizing the wireless earpieces in accordance with an illustrative embodiment.

FIG. 5 is a flowchart of a process for performing active filtering utilizing the wireless earpieces in accordance with an illustrative embodiment. In one embodiment, the process of FIG. 5 may be implemented by one or more wireless earpieces, such as the wireless earpieces 102 of FIG. 1. For example, the method of FIG. 5 may be performed by both wireless earpieces as a pair/set or for each of wireless earpieces individually. Likewise, information and data may be shared between the wireless earpieces to enhance the accuracy and effectiveness of the process of FIG. 5. The process of FIG. 5 may also be performed utilizing or in conjunction with another electronic device, such as a personal computer, cell phone, tablet, gaming device, smart card, surveillance system, or so forth. Any of the steps of FIG. 5 may be implemented automatically or in response to user selections, input, or feedback.

The process, methods, and steps of FIG. 5 may be performed at any time utilizing the wireless earpieces. In one embodiment, the process of FIG. 5 may begin by enabling active filtering in response to a user selection (step 502). The active filtering may be enabled based on any number of user inputs or selections, such as voice commands, tactile user input (e.g., taps, swipes, etc.), head motions, gestures, or so forth. The active filtering may also be enabled or initiated in response to a command or feedback from an external device, such as a smart phone. In another embodiment, the active filtering may be enabled automatically in response to the wireless earpieces being powered on, removal of the wireless earpieces from a smart case, an application being opened, sensing environmental or user conditions, user activities, or so forth.

Next, the wireless earpieces receive a selection of a desired audio input (step 504). The desired audio input may represent any number of audio inputs, sounds, or signals proximate or in the environment of the user. For example, the desired audio input may represent a user's voice. The desired audio input may also represent mechanical or machine generated sounds or voices potentially important to the user. In one embodiment, the user may specifically enter or record the desired audio input for analysis by the wireless earpieces or one or more connected communications or computing devices. For example, the user may record the voice of a parent or supervisor for distinct recognition within a group or noisy environment. The user or administrator of the wireless earpieces may select the desired audio input for purposes of recreation, work, organizational projects, sports activities, or so forth. Full signal and spectrum analysis may be performed for the desired audio input to best recognize the desired audio input in any number of situations (e.g., environments, activities, multiple individuals present, etc.).

Next, the wireless earpieces filter other audio inputs to enhance the desired audio input (step 506). The other audio inputs may include background, environmental, or other noises the user would like to actively filter. For example, the wireless earpieces may entirely remove or reduce the other audio inputs from an audio stream or audio content sensed by the wireless earpieces (e.g., ear-bone microphone, external microphones, etc.). In some embodiments, the other audio inputs may not be filtered, but instead, the desired audio input may be enhanced. For example, the desired audio input may be amplified, clarified (e.g., noise removal, etc.), and otherwise enhance for the user.

Next, the wireless earpieces terminate active filtering in response to a user selection (step 508). The active filtering may be disabled in response to any number of active or passive selections performed automatically or in response to input from the user. In one embodiment, the active filtering may be terminated in response to an affirmative input, command, or other selection received from the user. The active filtering may also be terminated or disabled in response to the wireless earpieces being powered down, placed in a smart case, removed from the ears of the user, or based on any other activity or action selected by the user.

Figure 6:
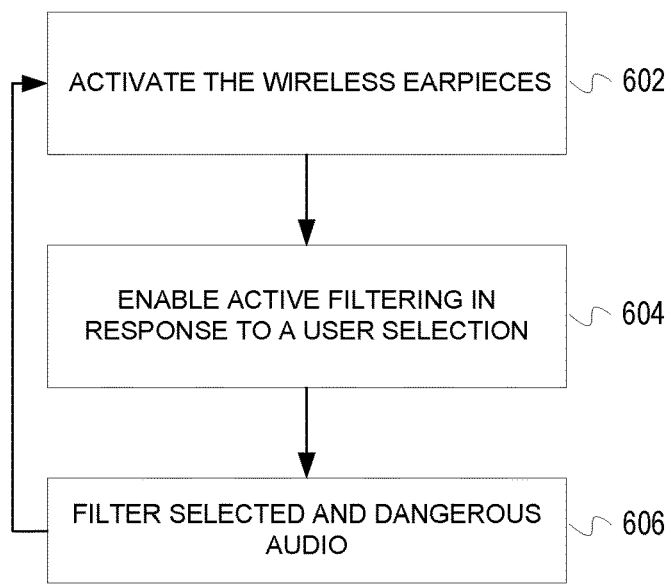
FIG. 6 is a flowchart of a process for filtering audio in accordance with an illustrative embodiment.

FIG. 6 is a flowchart of a process for filtering audio in accordance with an illustrative embodiment. The process of FIG. 6 may begin by activating the wireless earpieces (step 602). As previously noted, the wireless earpieces may be activated through a button or touchscreen selection, removal from a smart case, opening of a software application, placement in the heirs of the user, detection of dangerous or specified environmental conditions or user activities, or in response to any number of other activities or actions.

Next, the wireless earpieces enable active filtering in response to a user selection (step 604). As previously noted, the active filtering may be performed automatically or in response to a user selection. In one example, the active filtering may prevent dangerous audio inputs from being passed through to the user regardless of the circumstances, selections, or conditions. As a result, the wireless earpieces protect the user in all situations when worn and activated (e.g., battery power is sufficient to operate the wireless earpieces, the wireless earpieces are being worn, etc.).

Next, the wireless earpieces filter selected and dangerous audio inputs (step 606). In one embodiment, the selected or dangerous audio inputs may be preselected, predetermined, or otherwise identified in advance by the wireless earpieces. In other embodiments, the dangerous audio inputs may be actively filtered based on their sound profile. For example, if an audio input is determined to exceed one or more thresholds (e.g., dB, frequency, intensity, etc.) the audio input may be classified or treated as a dangerous audio input and actively filtered by the wireless earpieces. In one embodiment, the active filtering may include removing the audio signal from the streamed audio content sent to the user through the wireless earpieces. In another embodiment, the wireless earpieces may utilize the interference fit and blocking nature of the wireless earpieces to passively prevent the dangerous audio input from being communicated to the user. Because the wireless earpieces completely fill the ear canal where audio waves typically pass into the ears of the user, the wireless earpieces may be utilized as an excellent soundwave blocker.

In one embodiment, the sound or volume levels output to the user by the speakers of the wireless earpieces may also be automatically adjusted to the environment based on a determined user profile. For example, an automatically determined dB threshold may be utilized at a pre-programmed level. As a result, the user may be able to comfortably listen to the wireless earpieces without the need to manually adjust the volume to match the environment of the user. The microphone sensitivity may also be adjusted as needed. In addition, other components of the wireless earpieces may be adjusted based on the encountered environmental conditions. In one embodiment, each step of the process of FIG. 6 may include an alert or other indicator indicating the status of the self-configuration process to the user. The alerts may be communicated audibly, textually, tactilely or through any number of other communications processes available to the wireless earpieces or electronic devices in communication with the wireless earpieces.

In other embodiments subsequently described, the process of FIG. 6 may begin with the wireless earpieces identifying a user utilizing the wireless earpieces. The user may be identified to retrieve applicable information, data, and algorithms potentially utilized for the configuration process. In one embodiment, any number of users may utilize the wireless earpieces at a given time or on a given day. For example, the wireless earpieces may be utilized by different family members, as part of a business, or by different people within an organization. Each of the user's may have a profile or preferred settings for adjusting the volume, microphone, pass through of environmental noise, and other components and functionality of the wireless earpieces. The wireless earpieces may utilize sensor measurements, biometric readings, and user input to identify the user, such as one or more of pulse rate, hand gestures, designated motions, voice characteristics (e.g., amplitude, frequency, cadence, accent, etc.) ear/head topography, skin conductivity, vocabulary (e.g., specified words or phrases), genetic information, fingerprint, temperature, height, and so forth.

The wireless earpieces may also sense noises from an environment of the user utilizing one or more microphones of the wireless earpieces to perform the filtering and enhancement of FIGS. 5 and 6. The environment may correspond to any number of indoor or out your locations, such as a home, business, recreational facility, event, park, field, forest, outdoor gathering, and so forth. The wireless earpieces may include any number of microphones positioned on the wireless earpieces to determine ambient or dangerous noise. The microphones may also be sensitive to any number of frequencies. In one embodiment, microphones from both wireless earpieces may be utilized to determine the noise as well as directional intensity of the noise. For example, the wireless earpieces may determine the noisiest areas are to the west or left of the user. As a result, the wireless earpiece on the west/left side may have a slightly increased volume over the other wireless earpiece based on the orientation of the user.

In one embodiment, the wireless earpieces may automatically perform a dynamic enhancement or filtering process in response to set-up of the wireless earpieces, power up, a designated change in activities, a detected event (e.g., change in temperature beyond a threshold, sensed impact, altitude change, etc.), or environmental conditions. The configuration process may be initiated in response to one or more user or environmental thresholds being reached. In one embodiment, an indication requesting the configuration may be received directly from a user of the wireless earpieces. For example, the user may give a pre-programmed verbal command, such as "reset the filtering." The user input may also be a default voice command, gesture, head motion, or other input potentially sensed by the wireless earpieces. As a result, the configuration process may be initiated and processed entirely utilizing the wireless earpieces. In another embodiment, an indication may be received from a wireless device, such as a cell phone in communication with the wireless earpieces. For example, the wireless device may expect the configuration is necessary based on measured or inferred conditions.

The wireless earpieces determine an audio profile associated with the environment of the user. For example, the wireless earpieces may analyze the noise from the environment to select the associated audio profile. The audio profiles may be pre-programmed or may be specifically set and programmed by the user. The wireless earpieces may also determine the location of the user, an inferred activity of the user, and any other factors or conditions of the environment or circumstances of the user potentially affecting the noise level as well as the associated audio profile. In one embodiment, the audio profile may be defined by one or more noise thresholds. For example, an audio environment with noise below a low threshold may be considered a "quiet environment", whereas an audio environment with noise above a high threshold may be considered a "loud environment." In addition, any number of intermediate audio profiles may be selected.

In one embodiment, to perform the filtering and enhancement features and functions of the wireless earpieces dynamically configure components of the wireless earpieces including processing audio signals to perform filtering and enhancements, adjusting microphone and speaker settings, generating noise cancelling signals, blocking all audio input, and so forth. In one embodiment, the wireless earpieces may increase or decrease the volume of the speakers of the wireless earpieces for all content or specified portions of audio streams.

The wireless earpieces may also determine an audio profile is associated with dangerously high levels of environmental noise, such as a gunshot, fireworks, sporting event, workshop with tools running, or so forth. The wireless earpieces may prevent, limit, or filter the pass-through of environmental noises in response to determining the audio profile is dangerous or potentially harmful to the user. For example, the user may have set the wireless earpieces to pass through environmental noises, but the wireless earpieces may override the selection in response to the external noise levels reaching one or more thresholds. The wireless earpieces may reinstitute the pass-through of environmental noises in response to determining the audio profile associated with dangerous levels of noises has decreased. The wireless earpieces may also utilize an ear-bone microphone to detect and receive self-voice in response to detecting self-voice in the high noise or dangerous audio profiles. The wireless earpieces may also mute external microphones or audio inputs to more accurately detect the voice and sounds from the user. As a result, the voice of the user may be more accurately detected in high noise environments.

At any time, the wireless earpieces may allow the user to override the automatic configurations or adjustments made by the logic of the wireless earpieces to ensure the user is always control. For example, if the volume level is increased to a level the user does not like or is otherwise dissatisfied with, the user may easily adjust the speakers of the wireless earpieces wireless earpieces utilizing touch, gesture, or other controls provided by the user interface.

In some embodiments, the configuration process may be or include a calibration or diagnostic activity performed for all or portions of the sensors. The diagnostic may test functionality, accuracy, and any number of other factors. The calibration may include any number of mathematical, functional, software, or hardware tests, diagnostics, resets, biasing, and adjustments. The calibration may be performed for all, or a portion, of the sensors of the wireless earpieces. For example, only specific types of sensors (e.g., audio, optical/imaging, thermal, touch sensors, audio, contact, etc.) may be tested. To ensure proper operation and fit of the wireless earpieces within the ears of the user. In one embodiment, sensor measurements may be performed for comparison against baseline, default, ideal, or standard sensor measurements.

Alerts may be generated at any time during the process of FIG. 5. For example, a verbal or audio alert may indicate the wireless earpieces have been configured in response to changing environmental conditions. In one embodiment, step 404 is performed in response to detecting significant changes to the noise from the environment of the user. For example, the changes in the audio profile and noises may be determined to be significant if one or more thresholds are crossed.

In one embodiment, the alert is an internal alert potentially communicated to the user of the wireless device. For example, the alert may be communicated to the user as an audio, tactile, or visual alert, such as "the volume level has been configured for this environment." The alert may also be communicated to a wireless device in communication with the wireless earpiece. For example, an alert may be sent to a cell phone in communication with the wireless earpiece to display an application specific alert to the user, such as "the pass-through feature has been disabled due to the dangerous level of noise you are experiencing." In some embodiments, the alert may be sent through email, text message, or other designated communications technique. In other embodiments, no alert may be generated.

The illustrative embodiments provide a system, method, and wireless earpiece(s) for performing active filtering and enhancement of audio inputs automatically or based on environmental conditions, detected events, activities, thresholds or user input. The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, potentially including a machine-readable medium having stored thereon instructions, which may be used to program a computing system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or another communications medium.

Computer program code for carrying out operations of the embodiments may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 7:
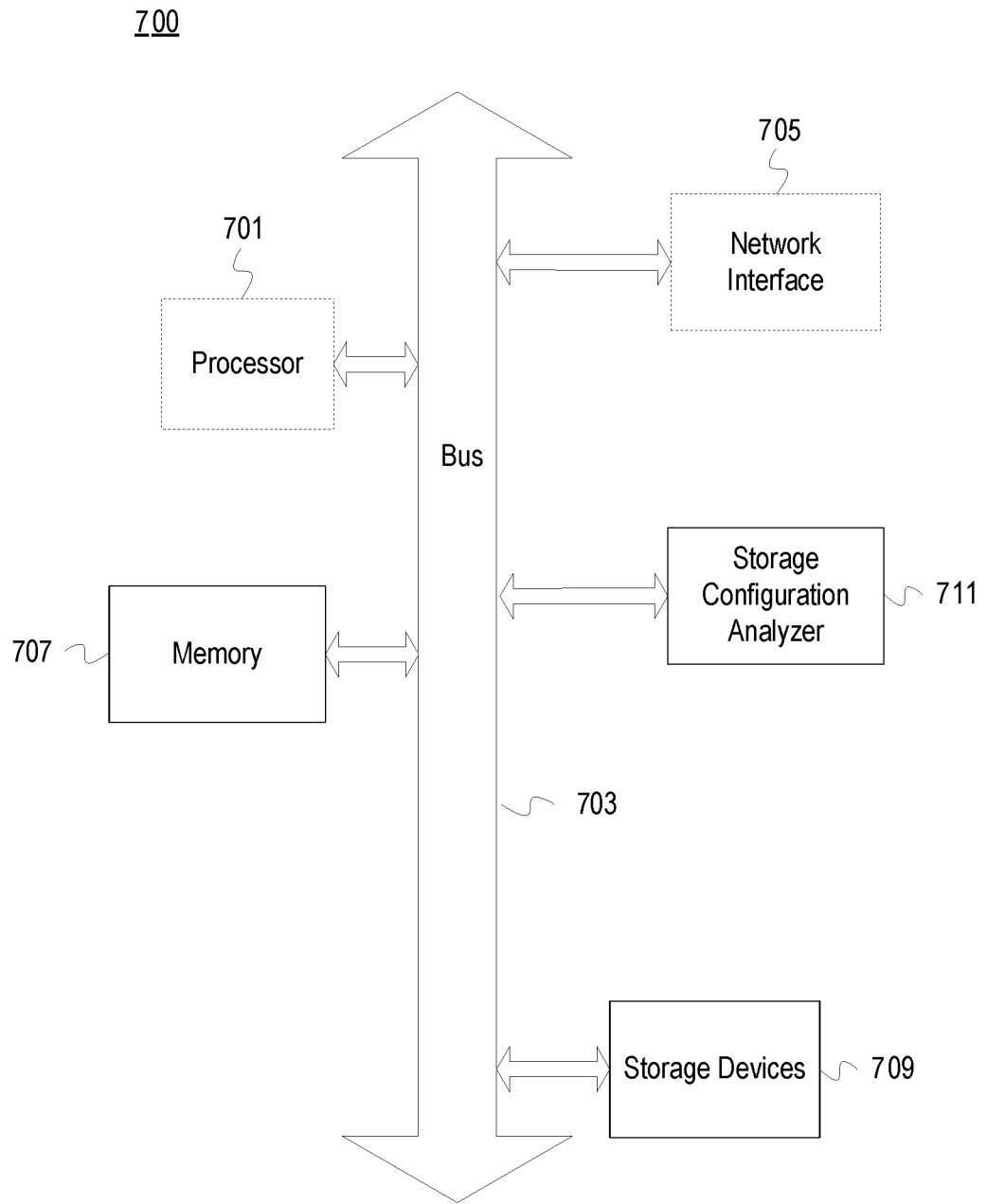
FIG. 7 depicts a computing system in accordance with an illustrative embodiment.

FIG. 7 depicts a computing system 700 in accordance with an illustrative embodiment. For example, the computing system 700 may represent an electronic computing or communications device, such as the wireless device 104 of FIG. 1. The computing device 700 may be utilized to receive user settings, instructions, or feedback for controlling the power management features of the wireless earpieces together and separately. The computing system 700 includes a processor unit 701 (possibly including multiple processors, multiple cores, multiple nodes, and/or implementing multi-threading, etc.). The computing system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 703, a network interface 705, and a storage device(s) 709. The system memory 707 embodies functionality to implement embodiments described above. The system memory 707 may include one or more functionalities facilitating recognizing audio information for filtering or enhancement. Code may be implemented in any of the other devices of the computing system 700. Any one of these functionalities may be partially (or entirely) implemented in hardware and/or on the processing unit 701. For example, the functionality may be implemented with an application specific integrated circuit, in logic implemented in the processing unit 701, in a co-processor on a peripheral device or card, etc. Further, realizations may include fewer or additional components not illustrated in FIG. 7. The processor unit 701, the storage device(s) 709, and the network interface 705 are coupled to the bus 703. Although illustrated as being coupled to the bus 703, the memory 707 may be coupled to the processor unit 701.

Figure 8:
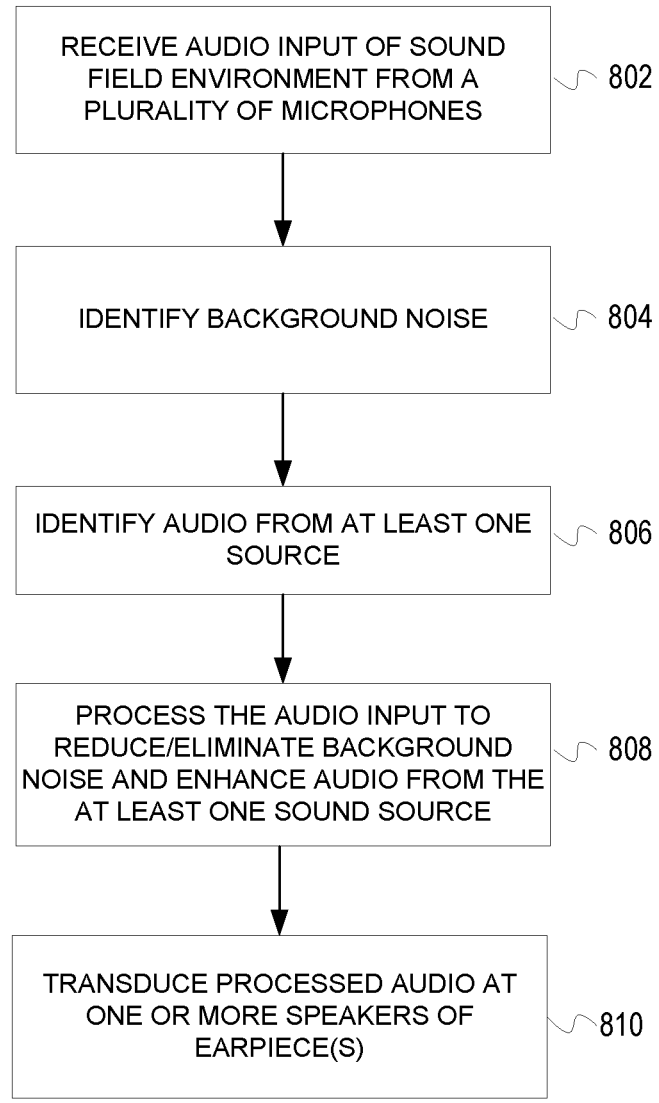
FIG. 8 illustrates another example of a method.

FIG. 8 illustrates another example of a method. In step 802, audio input of a sound field environment is received from a plurality of microphones. The plurality of microphones may be on different devices, for example, there may be a first plurality of microphones associated with a first earpiece and a second plurality of microphones associated with a second earpiece. Next, in step 804 background noise is identified. One or more processors may be used to identify the background noise using any number of methods. This may involve applying an active filter or other methodology. Next in step 802, audio from at least one source is identified. This may be performed in various ways using various audio processing algorithms including beamforming methods and techniques, sound mapping techniques, acoustic holography techniques, or other techniques. The one or more sounds sources may be, for example, the voice of a person, the sound of a machine, or any number of other possible sounds sources. Next in step 806, audio from at least one source is identified. This processing may use any number of source separation algorithms or other techniques to separate or isolate a sound source. Next in step 808, the audio input is processed to reduce or eliminate background noise and enhance audio from the at least one sound source. This may be accomplished in various ways. For example, an active filter may be applied to reduce or eliminate the background noise and intensity of sound from a source may be increased. In step 810 the processed audio may be transduced at one or more speakers of one or more earpieces.

It is also to be understood a user may configure their earpiece in various ways including to map names or keywords to sources. This allows a user to provide user input to one or more of the earpieces to specify a sound source. Thus, for example, a user can specify one or more sound sources they wish to focus on or else specify one or more sound sources which they wish to not focus on and which can be blocked or attenuated. The input may be in any form suitable for the earpiece including voice input from a user. Where voice input is used the voice input may include one or more keywords. The user input may also include one or more processing parameters. For example, a user can specify they wish the volume of a sound source reduced by 50 percent, or otherwise specify parameters.

The illustrative embodiments are not to be limited to the embodiments described herein. The illustrative embodiments contemplate numerous variations in the type of ways in which embodiments may be applied. The foregoing description has been presented for purposes of illustration and description. It is not intended to be an exhaustive list or limit any of the disclosure to the precise forms disclosed. It is contemplated other alternatives or exemplary aspects are considered included in the disclosure. The description is merely examples of embodiments, processes or methods of the invention. It is understood any other modifications, substitutions, and/or additions may be made, which are within the intended spirit and scope of the disclosure. For the foregoing, it can be seen the disclosure accomplishes at least all the intended objectives.

The previous detailed description is of a small number of embodiments for implementing the invention and is not intended to be limiting in scope. The following claims set forth several the embodiments of the invention disclosed with greater particularity.

What is claimed is:

1. A method for selective sound field environment processing for a set of wireless earpieces, having the following steps:
   communicating wirelessly between the wireless earpieces within the set of wireless earpieces;
   receiving audio input from a sound field environment from a plurality of microphones of the set of wireless earpieces;
   identifying a plurality of sound sources within the audio input and background noise from the sound field environment;
   receiving an input from a user of the set of wireless earpieces wherein the input from the user specifies one of the plurality of sound sources within the audio input from the sound field environment, wherein the one of the plurality of sound sources is a voice of a person;
   processing the sound field environment audio input using at least one processor of the set of wireless earpieces to enhance audio from the one of the plurality of sounds sources and reduce the background noise using active filtering to provide processed audio; and
   transducing the processed audio at one or more speakers of the set of wireless earpieces.

2. The method for selective sound field environment processing for the set of wireless earpieces of claim 1, further comprising the step of sharing the one of the plurality of sound sources between the first wireless earpiece and the second wireless earpiece.

3. The method for selective sound field environment processing for the set of wireless earpieces of claim 2, wherein the user specifies the one of the plurality of sound sources on an electronic device.

4. The method for selective sound field environment processing for the set of wireless earpieces of claim 3, wherein a user interface of the set of wireless earpieces accepts voice commands, tactile user input, head motions and/or gestures to select the one of the plurality of sound sources.

5. The method for selective sound field environment processing for the set of wireless earpieces of claim 4, further comprising the step of recording on a memory operably coupled to the set of wireless earpieces the one of the plurality of sound sources from the sound field environment audio input.

6. The method for selective sound field environment processing for the set of wireless earpieces of claim 5, further comprising the step of analyzing through full signal and spectrum analysis the one of the plurality of sound sources.

7. The method for selective sound field environment processing for the set of wireless earpieces of claim 6, further comprising the step of controlling volume of the one of the plurality of sound sources.

8. A method for selective sound field environment processing for a set of wireless earpieces, having the following steps:
   receiving audio input of a sound field environment from a plurality of microphones of each of the set of wireless earpieces;
   identifying a plurality of sound sources within the audio input from the sound field environment;
   identifying background noise in the sound field environment;
   receiving an input from a user of the set of wireless earpieces wherein the input from the user specifies one of the plurality of sound sources within the audio input from the sound field environment, wherein the one of the plurality of sound sources is a machine;

processing the sound field environment audio input using at least one processor of the set of wireless earpieces to enhance audio from the one of the plurality of sound sources and reduce the background noise using active filtering to provide processed audio; and transducing the processed audio at one or more speakers of the set of wireless earpieces.

9. The method for selective sound field environment processing for the set of wireless earpieces of claim 8, further comprising the step of preselecting, predefining and/or identifying by name the one of the plurality of sound sources.

10. The method for selective sound field environment processing for the set of wireless earpieces of claim 9, further comprising the step of classifying the one of the plurality of sound sources based upon an audio threshold.

11. The method for selective sound field environment processing for the set of wireless earpieces of claim 10, wherein the user can provide multiple inputs to specify more than the one of the plurality of sound sources.

12. The method for selective sound field environment processing for the set of wireless earpieces of claim 11, wherein the one of the plurality of sound sources can be identified by the audio threshold.

13. The method for selective sound field environment processing for the set of wireless earpieces of claim 12, further comprising the step of adjusting automatically volume at a speaker of the set of wireless earpieces based on a user profile.

14. The method for selective sound field environment processing for the set of wireless earpieces of claim 13, further comprising the step of identifying a user utilizing the set of wireless earpieces.

15. A method for selective sound field environment processing for a pair of wireless earpieces, the method comprising:

receiving audio input of a sound field environment from a plurality of microphones of each of the pair of wireless earpieces;

identifying a plurality of sound sources within the audio input from the sound field environment;

identifying background noise in the sound field environment;

receiving an input from a user of the pair of wireless earpieces wherein the input from the user specifies one of the plurality of sound sources within the audio input from the sound field environment, wherein the one of the plurality of sound sources is a sound source the user desires to focus on;

processing the audio input of the sound field environment using one or more processors of the pair of wireless earpieces to enhance audio from the one of the plurality of sound sources and reduce the background noise using active filtering to provide processed audio; and transducing the processed audio at one or more speakers of the pair of wireless earpieces.

16. The method for selective sound field environment processing for the pair of wireless earpieces of claim 15, further comprising the step of identifying the user utilizing sensor measurements, biometric readings and/or user input identified by at least one sensor operably coupled to the one or more processors of the pair of wireless earpieces.

17. The method for selective sound field environment processing for the pair of wireless earpieces of claim 16, further comprising the step of identifying more than the one of the plurality of sound sources.

18. The method for selective sound field environment processing for the pair of wireless earpieces of claim 17, further comprising the step of accepting multiple inputs from the user to specify additional sound sources from the plurality of sound sources the user desires to focus on.

19. The method for selective sound field environment processing for the pair of wireless earpieces of claim 18, further comprising the step of determining intensity and direction of the one of the plurality of sound sources.

20. The method for selective sound field environment processing for the pair of wireless earpieces of claim 19, further comprising the step of increasing volume at the one or more speakers based upon the detected intensity and direction of the one of the plurality sound sources.

* * * * *